(12) United States Patent
Jansson

(10) Patent No.: US 12,433,978 B2
(45) Date of Patent: Oct. 7, 2025

(54) PERITONEAL DIALYSIS CYCLER HAVING DISINFECTION

(71) Applicants: BAXTER INTERNATIONAL INC., Deerfield, IL (US); BAXTER HEALTHCARE SA, Glattpark (CH)

(72) Inventor: Olof Jansson, Vellinge (SE)

(73) Assignees: BAXTER INTERNATIONAL INC., Deerfield, IL (US); BAXTER HEALTHCARE SA, Glattpark (CH)

( * ) Notice: Subject to any disclaimer, the term of this patent is extended or adjusted under 35 U.S.C. 154(b) by 472 days.

(21) Appl. No.: 17/983,668

(22) Filed: Nov. 9, 2022

(65) Prior Publication Data
US 2023/0149610 A1 May 18, 2023

Related U.S. Application Data

(60) Provisional application No. 63/280,431, filed on Nov. 17, 2021.

(51) Int. Cl.
*A61M 1/16* (2006.01)
*A61M 1/28* (2006.01)

(52) U.S. Cl.
CPC ........ *A61M 1/1639* (2014.02); *A61M 1/1688* (2014.02); *A61M 1/282* (2014.02); *A61M 1/284* (2014.02); *A61M 1/285* (2013.01)

(58) Field of Classification Search
CPC .. A61M 1/1639; A61M 1/1688; A61M 1/282; A61M 1/284; A61M 1/285
See application file for complete search history.

(56) References Cited

U.S. PATENT DOCUMENTS

| 9,227,003 B2 * | 1/2016 | Cicchello | A61M 1/1561 |
| 2016/0095970 A1 * | 4/2016 | Kelly | A61M 1/3437 |
| | | | 210/195.2 |
| 2016/0334348 A1 * | 11/2016 | Jones | G01N 24/087 |

* cited by examiner

*Primary Examiner* — John Kim
(74) *Attorney, Agent, or Firm* — K&L Gates LLP

(57) ABSTRACT

A dialysis system includes a dialysis fluid metering pump; at least one volumetric balancing chamber including a first fixed volume chamber and a first diaphragm positioned and arranged to extend back and forth within the first volumetric balancing chamber; a first outlet line extending between the first volumetric balancing chamber and an inlet to the dialysis fluid metering pump; a second outlet line extending between the first volumetric balancing chamber and a drain line; a first inlet line extending between the first volumetric balancing chamber and an outlet from the dialysis fluid metering pump; a second inlet line extending between the first volumetric balancing chamber and a used dialysis fluid line.

18 Claims, 14 Drawing Sheets

PERITONEAL DIALYSIS CYCLER HAVING DISINFECTION

PRIORITY CLAIM AND CROSS-REFERENCE TO RELATED APPLICATIONS

This application claims priority to and benefit of U.S. Provisional Patent App. No. 63/280,431 filed Nov. 17, 2021, titled PERITONEAL DIALYSIS CYCLER HAVING DISINFECTION, the entire contents of which are incorporated by reference herein and relied upon.

BACKGROUND

The present disclosure relates generally to medical fluid treatments and in particular to dialysis fluid treatments.

Due to various causes, a person's renal system can fail. Renal failure produces several physiological derangements. It is no longer possible to balance water and minerals or to excrete daily metabolic load. Toxic end products of metabolism, such as, urea, creatinine, uric acid and others, may accumulate in a patient's blood and tissue.

Reduced kidney function and, above all, kidney failure is treated with dialysis. Dialysis removes waste, toxins and excess water from the body that normal functioning kidneys would otherwise remove. Dialysis treatment for replacement of kidney functions is critical to many people because the treatment is lifesaving.

One type of kidney failure therapy is Hemodialysis ("HD"), which in general uses diffusion to remove waste products from a patient's blood. A diffusive gradient occurs across the semi-permeable dialyzer between the blood and an electrolyte solution called dialysate or dialysis fluid to cause diffusion.

Hemofiltration ("HF") is an alternative renal replacement therapy that relies on a convective transport of toxins from the patient's blood. HF is accomplished by adding substitution or replacement fluid to the extracorporeal circuit during treatment. The substitution fluid and the fluid accumulated by the patient in between treatments is ultrafiltered over the course of the HF treatment, providing a convective transport mechanism that is particularly beneficial in removing middle and large molecules.

Hemodiafiltration ("HDF") is a treatment modality that combines convective and diffusive clearances. HDF uses dialysis fluid flowing through a dialyzer, similar to standard hemodialysis, to provide diffusive clearance. In addition, substitution solution is provided directly to the extracorporeal circuit, providing convective clearance.

Most HD, HF, and HDF treatments occur in centers. A trend towards home hemodialysis ("HHD") exists today in part because HHD can be performed daily, offering therapeutic benefits over in-center hemodialysis treatments, which occur typically bi- or tri-weekly. Studies have shown that more frequent treatments remove more toxins and waste products and render less interdialytic fluid overload than a patient receiving less frequent but perhaps longer treatments. A patient receiving more frequent treatments does not experience as much of a down cycle (swings in fluids and toxins) as does an in-center patient, who has built-up two or three days' worth of toxins prior to a treatment. In certain areas, the closest dialysis center can be many miles from the patient's home, causing door-to-door treatment time to consume a large portion of the day. Treatments in centers close to the patient's home may also consume a large portion of the patient's day. HHD can take place overnight or during the day while the patient relaxes, works or is otherwise productive.

Continuous renal replacement treatment ("CRRT") is a blood treatment like HD, HF and HDF, but instead occurs in an acute setting, e.g., hospital, where the patient may be experiencing kidney failure due to an external cause placing the patient in the hospital. Because the patient is likely in the hospital for a prolonged period, CRRT can be run more slowly than a typical chronic HD treatment. CRRT treatments typically use bags of dialysis fluid (HD) or replacement fluid (HF and HDF) and are accordingly like peritoneal dialysis discussed next in that aspect (although certain HHD systems also used bagged dialysis fluid). CRRT treatments are however blood treatments that may be performed using an HD tubing arrangement (typical in the US) or an HF or HDF tubing arrangement (typical in Europe).

Another type of kidney failure therapy as mentioned above is peritoneal dialysis ("PD"), which infuses a dialysis solution, also called dialysis fluid, into a patient's peritoneal chamber via a catheter. The dialysis fluid is in contact with the peritoneal membrane in the patient's peritoneal chamber. Waste, toxins and excess water pass from the patient's bloodstream, through the capillaries in the peritoneal membrane, and into the dialysis fluid due to diffusion and osmosis, i.e., an osmotic gradient occurs across the membrane. An osmotic agent in the PD dialysis fluid provides the osmotic gradient. Used or spent dialysis fluid is drained from the patient, removing waste, toxins and excess water from the patient. This cycle is repeated, e.g., multiple times.

There are various types of peritoneal dialysis therapies, including continuous ambulatory peritoneal dialysis ("CAPD"), automated peritoneal dialysis ("APD"), tidal flow dialysis and continuous flow peritoneal dialysis ("CFPD"). CAPD is a manual dialysis treatment. Here, the patient manually connects an implanted catheter to a drain to allow used or spent dialysis fluid to drain from the peritoneal chamber. The patient then switches fluid communication so that the patient catheter communicates with a bag of fresh dialysis fluid to infuse the fresh dialysis fluid through the catheter and into the patient. The patient disconnects the catheter from the fresh dialysis fluid bag and allows the dialysis fluid to dwell within the peritoneal chamber, wherein the transfer of waste, toxins and excess water takes place. After a dwell period, the patient repeats the manual dialysis procedure, for example, four times per day. Manual peritoneal dialysis requires a significant amount of time and effort from the patient, leaving ample room for improvement.

Automated peritoneal dialysis ("APD") is similar to CAPD in that the dialysis treatment includes drain, fill and dwell cycles. APD machines, however, perform the cycles automatically, typically while the patient sleeps. APD machines free patients from having to manually perform the treatment cycles and from having to transport supplies during the day. APD machines connect fluidly to an implanted catheter, to a source or bag of fresh dialysis fluid and to a fluid drain. APD machines pump fresh dialysis fluid from a dialysis fluid source, through the catheter and into the patient's peritoneal chamber. APD machines also allow for the dialysis fluid to dwell within the chamber and for the transfer of waste, toxins and excess water to take place. The source may include multiple liters of dialysis fluid including several solution bags.

APD machines pump used or spent dialysate from the patient's peritoneal cavity, though the catheter, to drain. As with the manual process, several drain, fill and dwell cycles occur during dialysis. A "last fill" may occur at the end of the APD treatment. The last fill fluid may remain in the peritoneal chamber of the patient until the start of the next treatment, or may be manually emptied at some point during the day.

In any of the above modalities using an automated machine, fluid control is very important because such control controls the flow of fresh and used dialysis fluid to and from the patient. One HD machine provided by the assignee of the present disclosure controls fluid flow provided by fresh and used dialysis fluid pumps. A flow sensor is provided for each dialysis fluid pump. By pulling somewhat more used dialysis fluid from the dialyzer than the fresh dialysis fluid delivered to the dialyzer, as measured by the flow sensors, a desired amount of patient ultrafiltration ("UF") is achieved. While the method of control works well, the flow sensors can be expensive.

In any of the above modalities using an automated machine, the automated machine operates typically with a disposable set, which is discarded after a single use. Depending on the complexity of the disposable set, the cost of using one set per day may become significant. Also, daily disposables require space for storage, which can become a nuisance for home owners and businesses. Further, the disposable sets can create a large amount of hard and soft plastic waste. Moreover, daily disposable replacement requires daily setup time and effort by the patient or caregiver at home or at a clinic.

For each of the above reasons, it is desirable to provide an automated dialysis machine (blood and PD) that simplifies fresh and used dialysis fluid flow control and reduces disposable waste.

SUMMARY

Known automated dialysis systems (blood and PD) typically include a machine or cycler that accepts and actuates a pumping cassette having a hard part and a soft part that is deformable for performing pumping and valving operations. The hard part is attached to tubes that extend to various bags. The disposable cassette and associated tubes and bags can be cumbersome for a patient or caregiver to load for treatment. The overall amount of disposable items may also lead to multiple setup procedures, which can expose room for error. The disposable items are expensive and cumbersome to dispose of as discussed above.

The APD system and associated methodology of the present disclosure, on the other hand, converts much of the fluid carrying portions of its PD system into reusable components, which are disinfected after treatment. Fluid lines within the machine or cycler are reused. Disposable items remaining may include the patient and drain lines, the dialysis fluid containers or bags and the solution lines. When not connected to fluid containers or bags, or to an online dialysis fluid generation source, the reusable dialysis fluid lines may be connected to dedicated disinfection connectors or to themselves. In either embodiment, the reconnected dialysis fluid lines form a disinfection loop, which allows for disinfection after treatment. It is contemplated to use either water or leftover dialysis fluid as the disinfecting fluid and to heat same to a disinfection temperature, e.g., between 70° C. and 130° C. The flow components, lines and tubes that are disinfected may be metal, e.g., stainless steel, or plastic, e.g., polyvinylchloride ("PVC") or a non-PVC material, such as polyethylene ("PE"), polyurethane ("PU") or polycarbonate ("PC").

Inside a housing of the machine or cycler, reusable tubing lines run through one or more dialysis fluid line valve. In an embodiment, any of the valves of the blood or PD machine may be an electrically actuated solenoid valve having a reusable valve body that occludes (e.g., when unpowered) or allows (e.g., when powered) PD fluid to flow through the body. A dialysis fluid inline heater may also be provided and be electrically actuated in one embodiment. The inline heater is, for example, a resistive heater having a reusable heater body that accepts dialysis fluid for heating. The inline heater in an embodiment is able to heat dialysis fluid from room temperature to body temperature, e.g., 37° C., at a flowrate of at least 300 milliliters ("ml")/minute for PD and at higher flowrates for HD. One or more temperature sensor may be located adjacent to the heater, e.g., downstream from the heater, to provide feedback for temperature control. In an alternative embodiment for PD, the heater may be a batch heater, e.g., a resistive plate batch heater, which is capable of achieving the heating parameters discussed above.

The machine embodiments discussed herein include a single, reusable dialysis fluid pump, such as an accurate volumetric pump. The reusable pump includes a reusable pump body that accepts blood or PD dialysis fluid for pumping. That is, the pump does not require the dialysis fluid to flow within a disposable item, such as a tube or cassette. The reusable volumetric dialysis fluid pump may be an electrically operated piston, membrane or gear pump, which may be inherently accurate. The dialysis fluid pump is bidirectional and continuous in one embodiment, such that a single pump may be provided. The dialysis fluid pump may be controllable to pump to and from a dialyzer or the patient at or below a pressure limit by controlling a level of current, or a pulse rate, to the dialysis fluid pump. The pressure limits are different for a blood treatment versus PD but are adhered to in either case.

Each of the embodiments described herein includes one or more volumetric balancing chamber, which includes a well-defined volume chamber separated by a membrane or diaphragm. The diaphragm is able to flex back and forth within the chamber to dispel a volume of fluid, e.g., fresh or used dialysis fluid by receiving the same volume of fluid, e.g., used or fresh dialysis fluid. The volumetric balancing chambers may be used differently in a blood treatment versus PD, however, for each embodiment they allow a single dialysis fluid pump to be used. The single dialysis fluid pump pumps to each of the volumetric balancing chambers as determined by the states of the valves. The valves are sequenced to direct fresh or used dialysis to the volumetric balancing chambers and to enable fresh or used dialysis fluid to be delivered from the chambers to the dialyzer/patient or to drain, respectively. The volumetric balancing chambers also perform a supervisory task in that their known volume outputs may be used to check that the stroke volume of the piston pump does not change over time.

Either the blood treatment or PD versions of the present disclosure may operate with an online source of dialysis fluid or with containers of dialysis fluid. The flowrates associated with HD and HDF for a chronic machine may be too high to use containers or bags in practical way. A CRRT blood treatment however typically uses containers or bags of dialysis fluid. For PD, it may be desirable for the machine to be able to operate with either online or bagged dialysis fluid, e.g., online fluid at home to reduce disposable waste and bagged fluid on the road where it is difficult to transport the online dialysis fluid generation unit. An advantage of the present disclosure for PD is that either the online fluid generation source or the bagged dialysis fluid may provide different dialysis fluid glucose levels for different patient fills, e.g., 1.36% glucose PD fluid versus 2.27% glucose PD fluid. A last container of a different formulation of PD fluid, such as icodextrin, may also be provided. Another advantage of the online dialysis fluid generation system having a purified water source is that piston pumps often require a flush flow for lubrication, which may be provided by tapping off of the purified water source.

Each of the embodiments discussed herein may also include an airtrap to trap air removed from the dialysis fluid and to provide a bolus or buffer of dialysis fluid. The airtrap may also be involved in the disinfection sequence at the end of treatment. The airtrap may be located for example in a used dialysis fluid line. A vent valve may be provided off of the top of the airtrap, which vents air from the airtrap to atmosphere for example and may be used during the disinfection sequence. In an embodiment, one or more level sensor is located adjacent the airtrap so that a desired level or range of levels of dialysis fluid may be maintained in the airtrap.

Each of the embodiments discussed herein may also include one or more pressure sensor for detecting the pressure of fresh and used blood or PD dialysis fluid. The pressure sensors output positive and negative dialyzer (blood) or patient (PD) pumping pressure signals, which are used to ensure that pumping pressure limits are not exceeded. One or more temperature compensated conductivity sensor may also be provided to give feedback for online mixing and for evaluation used PD fluid if desired.

The blood treatment and PD machines of the present disclosure include a control unit having one or more processor and one or more memory that receive signals or outputs from the pressure sensors, one or more temperature sensor, and conductivity sensor and process the signals or outputs as feedback. The control unit uses pressure feedback to control the dialysis fluid pump to pump at safe pressure limits during treatment and safe system limits during disinfection. The control unit uses temperature feedback to control the dialysis fluid heater to heat the fresh dialysis fluid to, e.g., body temperature. The control unit also counts strokes executed by the volumetric balancing chambers to determine a total amount of fresh dialysis fluid delivered to the dialyzer or patient and the total amount of used dialysis fluid removed from the dialyzer or patient. The control unit also compares those amounts to determine an overall amount of ultrafiltration ("UF") removed from the patient (for both blood treatments and PD).

The control unit also opens and closes the dialysis fluid valves to sequence the volumetric balancing chambers in combination with the operation of the dialysis fluid pump to run a priming sequence, a treatment sequence (different for blood treatment verses PD) and a disinfection sequence after treatment. The control unit also powers the heater during the treatment and disinfection sequences.

In light of the disclosure set forth herein, and without limiting the disclosure in any way, in a first aspect of the present disclosure, which may be used with any other aspect, or portion thereof, a dialysis system includes a dialysis fluid metering pump; a first volumetric balancing chamber including a first fixed volume chamber and a first diaphragm positioned and arranged to extend back and forth within the first fixed volume chamber; a first outlet line extending between the first volumetric balancing chamber and an inlet to the dialysis fluid metering pump; a second outlet line extending between the first volumetric balancing chamber and a drain line; a first inlet line extending between the first volumetric balancing chamber and an outlet from the dialysis fluid metering pump; a second inlet line extending between the first volumetric balancing chamber and a used dialysis fluid line; a second volumetric balancing chamber including a second fixed volume chamber and a second diaphragm positioned and arranged to extend back and forth within the second fixed volume chamber; a first outlet line extending between the second volumetric balancing chamber and an inlet to the dialysis fluid metering pump; a second outlet line extending between the second volumetric balancing chamber and a drain line; a first inlet line extending between the second volumetric balancing chamber and an outlet from the dialysis fluid metering pump; and a second inlet line extending between the second volumetric balancing chamber and a used dialysis fluid line.

In a second aspect of the present disclosure, which may be used with any other aspect, or portion thereof, the dialysis system is a hemodialysis ("HD") system, and wherein fresh HD fluid is delivered to a dialyzer via the dialysis fluid metering pump pulling fresh HD fluid from at least one of the first or second volumetric balancing chambers via the at least one first outlet line.

In a third aspect of the present disclosure, which may be used with any other aspect, or portion thereof, pulling fresh HD fluid from at least one of the first or second volumetric balancing chambers via the at least one first outlet line causes used dialysis fluid to fill at least one of the first or second volumetric balancing chambers via the at least one second inlet line extending between the first or second volumetric balancing chamber and the used dialysis fluid line.

In a fourth aspect of the present disclosure, which may be used with any other aspect, or portion thereof, the HD system includes an inline dialysis fluid heater located upstream or downstream from the dialysis fluid metering pump.

In a fifth aspect of the present disclosure, which may be used with any other aspect, or portion thereof, the pulling of the fresh HD fluid from at least one of the first or second volumetric balancing chambers is repeated until a desired amount of fresh HD fluid is delivered to the dialyzer.

In a sixth aspect of the present disclosure, which may be used with any other aspect, or portion thereof, the at least one of the first or second volumetric balancing chambers is replenished with fresh HD fluid prior to repeating delivery of the fresh HD fluid to the dialyzer.

In a seventh aspect of the present disclosure, which may be used with any other aspect, or portion thereof, the dialysis system is a hemodialysis ("HD") system, and wherein used HD fluid is delivered to the drain line via the at least one second outlet line and via the dialysis fluid metering pump pushing fresh HD fluid to at least one of the first or second volumetric balancing chambers via the at least one first inlet line.

In an eighth aspect of the present disclosure, which may be used with the seventh aspect, the HD system is configured such that used HD fluid is precluded from flowing along the used dialysis fluid line when the used HD fluid is delivered to the drain line.

In a ninth aspect of the present disclosure, which may be used with any other aspect, or portion thereof, the dialysis system of is a hemodialysis ("HD") system, and wherein an ultrafiltration ("UF") stroke occurs via pushing used HD fluid to the drain line without a corresponding delivery of fresh HD fluid to a dialyzer.

In a tenth aspect of the present disclosure, which may be used with any other aspect, or portion thereof, a UF stroke occurs via the dialysis fluid metering pump pulling fresh HD fluid from one of the first or second volumetric balancing chambers and pushing the fresh HD fluid to the other of the first or second volumetric balancing chambers, thereby pushing used HD fluid to the drain line without a corresponding delivery of fresh HD fluid to the dialyzer.

In an eleventh aspect of the present disclosure, which may be used with any other aspect, or portion thereof, pulling of fresh HD fluid from one of the first or second volumetric balancing chambers by the dialysis fluid metering pump correspondingly pulls used HD fluid into the first or second volumetric balancing chamber.

In a twelfth aspect of the present disclosure, which may be used with any other aspect, or portion thereof, a UF stroke, or a partial UF stroke, is repeated until a desired amount of UF is removed to the drain line.

In a thirteenth aspect of the present disclosure, which may be used with any other aspect, or portion thereof, the dialysis system is a peritoneal dialysis ("PD") system, wherein fresh PD fluid is delivered to a patient line via the dialysis fluid metering pump.

In a fourteenth aspect of the present disclosure, which may be used with any other aspect, or portion thereof, the accuracy of the dialysis fluid metering pump is relied upon to pump a prescribed amount of fresh PD fluid to the patient.

In a fifteenth aspect of the present disclosure, which may be used with any other aspect, or portion thereof, the PD system is configured to perform a patient dwell after delivering a prescribed amount of fresh PD fluid to the patient.

In a sixteenth aspect of the present disclosure, which may be used with any other aspect, or portion thereof, the PD system is configured to perform a patient drain in which used PD fluid is delivered to and removed from at least one of the first or second volumetric balancing chambers.

In a seventeenth aspect of the present disclosure, which may be used with any other aspect, or portion thereof, the PD system is configured to determine an amount of excess fluid removed from the patient by subtracting an amount of fresh PD fluid delivered to the patient line from an amount of used PD fluid removed from the patient.

In an eighteenth aspect of the present disclosure, which may be used with any other aspect, or portion thereof, the PD system is (i) a continuous cycling peritoneal dialysis ("CCPD") system, wherein the patient line includes a fresh leg and a used leg, or (ii) a continuous flow peritoneal dialysis ("CFPD") system in which the patient line is separated into a fresh PD fluid patient line and a used PD fluid patient line.

In a nineteenth aspect of the present disclosure, which may be used with any other aspect, or portion thereof, a dialysis system includes a dialysis fluid metering pump; a first volumetric balancing chamber positioned and arranged to operate with the dialysis fluid metering pump, the first volumetric balancing chamber including a first fixed volume chamber and a first diaphragm positioned and arranged to extend back and forth within the first fixed volume chamber; a second volumetric balancing chamber positioned and arranged to operate with the dialysis fluid metering pump, the second volumetric balancing chamber including a second fixed volume chamber and a second diaphragm positioned and arranged to extend back and forth within the second fixed volume chamber; first and second ports fluidly operable with the first and second volumetric balancing chambers; first and second flexible dialysis fluid lines connectable to the first and second ports and to a dialyzer for performing hemodialysis; a PD fluid patient line including a fresh leg connectable to the first port and a used leg connectable to the second port for performing continuous cycling peritoneal dialysis; and a fresh PD fluid patient line connectable to the first port and a used PD fluid patient line connectable to the second port for performing continuous flow peritoneal dialysis.

In a twentieth aspect of the present disclosure, which may be used with any other aspect, or portion thereof, the first and second flexible dialysis fluid lines are connectable to the first and second ports via port lids that seal to the first and second ports.

In a twenty-first aspect of the present disclosure, which may be used with any other aspect, or portion thereof, the dialysis system includes recirculation connectors, and wherein the first and second flexible dialysis fluid lines when disconnected from the dialyzer are connectable to the recirculation connectors for disinfection.

In a twenty-second aspect of the present disclosure, which may be used with any other aspect, or portion thereof, the dialysis system includes a housing holding the metering pump and the first and second volumetric balancing chambers, the first and second ports and the recirculation connectors presented by the housing.

In a twenty-third aspect of the present disclosure, which may be used with any other aspect, or portion thereof, any of the features, functionality and alternatives described in connection with any one or more of FIGS. 1 to 14 may be combined with any of the features, functionality and alternatives described in connection with any other of FIGS. 1 to 14.

In light of the above aspects and the present disclosure set forth herein, it is an advantage of the present disclosure to provide a dialysis fluid machine and associated system that reuses many components, which may otherwise be disposable.

It is another advantage of the present disclosure to provide fluid handling components that accept dialysis fluid directly without having to operate with a disposable item, such as a tube or flexible sheeting.

It is a further advantage of the present disclosure to provide a dialysis fluid circuit that may be used for a blood treatment (HD, HHD, HF, HDF, CRRT) or PD, streamlining manufacturing, training and maintenance.

It is yet another advantage of the present disclosure to provide a single volumetric pump that may be used to pump to and from a dialyzer or patient.

It is still another advantage of the present disclosure to provide a dialysis fluid circuit that enables the pump to only see fresh dialysis fluid and to avoid pumping used dialysis fluid or patient effluent.

It is still another advantage of the present disclosure to provide a dialysis fluid machine and associated system that may use leftover treatment fluid during disinfection.

Additional features and advantages are described in, and will be apparent from, the following Detailed Description and the Figures. The features and advantages described herein are not all-inclusive and, in particular, many additional features and advantages will be apparent to one of ordinary skill in the art in view of the figures and description. Also, any particular embodiment does not have to have all of the advantages listed herein and it is expressly contemplated to claim individual advantageous embodiments separately. Moreover, it should be noted that the language used in the specification has been selected principally for readability and instructional purposes, and not to limit the scope of the inventive subject matter.

DETAILED DESCRIPTION

Blood Treatment System

Figure 1:
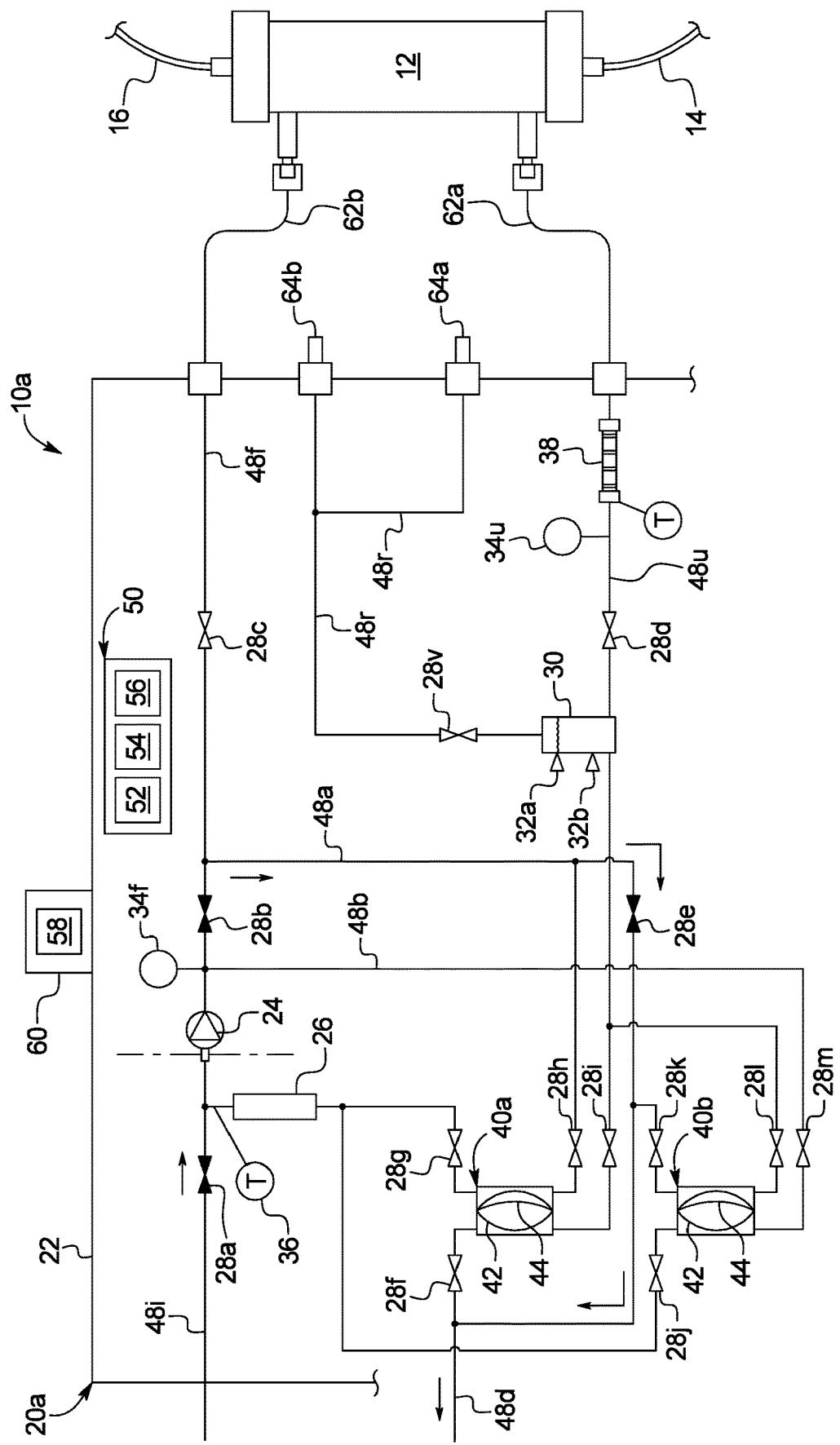
FIG. 1 is a schematic view of one embodiment of a blood treatment dialysis machine and associated system of the present disclosure in a startup phase.

Referring now to the drawings and in particular to FIG. 1, a blood treatment ("HD, HHD, HDF, CRRT") system 10*a* and associated methodology of the present disclosure includes a blood treatment dialysis machine 20*a*. System 10*a* and dialysis machine 20*a* (as do other systems and cyclers described herein) attempt to eliminate disposable items as much as possible and instead provide a majority of its fluid carrying portions as reusable components, which are disinfected after treatment. Dialysis machine 20*a* includes a housing 22 that holds the reusable flow components and tubes or lines described herein. Any of the housing and reusable flow components and lines discussed herein may be made of metal, e.g., stainless steel, or plastic, e.g., polyvinylchloride ("PVC") or a non-PVC material, such as polyethylene ("PE"), polyurethane ("PU") or polycarbonate ("PC"). The housing may additionally or alternatively be made of steel and/or aluminum.

Dialysis machine 20*a* includes a dialysis fluid pump 24, such as an electrically operated piston, membrane or gear pump, which may be inherently accurate. Dialysis machine also includes a heater 26, such as an inline heater, which is capable of heating blood treatment dialysis fluid from room temperature or colder to body temperature, e.g., 37° C. Heater 26 is sized such that it can heat fluid to the prescribed temperature for any specified flow rates, such as 700 milliliters ("ml")/minute for flow to dialyzer 12. Heater 26 is able to be cycled on and off to heat an intermittent dialysis fluid flow, wherein the heater is only powered when dialysis fluid flows through the heater. Heater 26 is also capable of supplying disinfection fluid at any of the disinfection temperatures discussed herein and at any desired disinfection flowrate It should be appreciated that heater 26 may also be used for purposes other than treatment and disinfection. Heater 26 may for example be used during dialysis fluid preparation. Heater 26 controls the fluid temperature of the fluid passing one or more conductivity sensor (e.g., conductivity sensor 38), which is used to verify accurate mixing. A fixed temperature makes conductivity measurements more accurate. The systems described herein, including system 10*a*, may alternatively provide two heaters, one for dialysis fluid mixing and another for treatment, and wherein the two heaters are sized differently and appropriately for their applications.

Dialysis machine 20*a* includes a plurality of valves 28*a* to 28*v*, which may be electrically actuated solenoid valves having a reusable valve body that occludes (e.g., when unpowered) or allows (e.g., when powered) dialysis fluid to flow through the body. Valve 28*a* is a fresh dialysis fluid inlet valve. Valve 28*b* is an upstream fresh dialysis fluid diverter valve. Valve 28*c* is a fresh dialysis fluid outlet valve. Valve 28*d* is a used dialysis fluid inlet valve. Valve 28*e* is a downstream fresh dialysis fluid diverter valve. Valves 28*f* to 28*i* are fresh and used dialysis fluid inlet and outlet valves for a first volumetric balancing chamber 40*a*. Valves 28*j* to 28*m* are fresh and used dialysis fluid inlet and outlet valves for a second volumetric balancing chamber 40*b*. Valve 28*v* is a vent valve provided with an airtrap 30, which in the illustrated embodiment is filled with used dialysis fluid. Vent valve 28*v* vents air from airtrap 30 to atmosphere during treatment and may be used to create a disinfection loop for disinfection at the end of treatment. In an embodiment, one or more level sensor 32*a*, 32*b* is located adjacent airtrap 30, so that a desired level or range of levels of PD fluid may be maintained in the airtrap. The placement of airtrap 30 helps to prevent air from reaching volumetric balancing chambers 40*a* and 40*b*, which could affect their accuracy. Level sensors 32*a*, 32*b* may be ultrasonic, capacitance, inductive or optical sensors capable of discerning between used dialysis fluid versus air inside airtrap 30.

Dialysis machine 20*a* also includes a fresh dialysis fluid pressure sensor 34*f* and a used dialysis fluid pressure sensor 34*u*. The outputs from pressure sensors 34*f* and 34*u* are used to make sure that the pumping of fresh and used dialysis to and from dialyzer 12 is performed within safe limits (along with blood pumped through the dialyzer). In an example for HD and for a small dialyzer 12, a dialysis fluid pressure drop along the dialyzer may be less than 30 mmHg, while a blood side pressure drop along the same dialyzer may be less than 60 mmHg (for a blood side flowrate Qb of 300 ml/min). For a larger dialyzer, the pressure drop for dialysis fluid may be less than 30 mmHg at a dialysis fluid flowrate Qd of 500 ml/min and less than 40 mmHg for a dialysis fluid flowrate Qd of 700 ml/min. A blood side pressure drop for the same dialyzer may be less than 100 mmHg for a blood side flowrate Qb of 300 ml/min. The flowrates for CRRT are different as are the dialyzers used. Here, a dialysis fluid inlet pressure into the CRRT dialyzer 12 may be about 170 mmHg, while a dialysis fluid pressure outlet from the dialyzer may be about 135 mmHg.

Dialysis machine 20*a* further includes at least one temperature sensor 36 located adjacent to inline heater 26. In the illustrated embodiment, temperature sensor 36 is located downstream from heater 26. A second temperature sensor may also be located upstream from heater 26. The output from temperature sensor 36 is used as feedback to control how much power is supplied to inlet heater 26 when fresh dialysis fluid is flowing through same.

Dialysis machine 20*a* further includes at least one conductivity sensor 38, which may be temperature compensated. In FIG. 1, conductivity sensor 38 is shown located to sense used dialysis fluid, which may be more applicable to the PD embodiment discussed below. Conductivity sensors are also shown in operation with an online dialysis fluid mixing circuit below in FIG. 14.

Dialysis machine 20a of system 10a includes a control unit 50 having one or more processor 52, one or more memory 54 and a video controller 56, which controls a display device 58 associated with a user interface of the machine. Control unit 50 controls each of dialysis fluid pump 24, inline heater 26, valves 28a to 28m and 28v according to the flow sequences discussed herein. Control unit 50 also receives outputs from level sensors 32a, 32b, pressure sensors 34f, 34u, one or more temperature sensor 36 and one or more conductivity sensor 38, and uses those outputs for the feedback purposes discussed herein and also for any readout(s) desired at display device 58.

User interface 60 may include a touchscreen operable with a display device 58 and/or one or more electromechanical button, such as a membrane switch for inputting user commands. User interface 60 displays information to the user at display device 58 and may also include one or more speaker for outputting alarms, alerts and/or voice guidance commands. User interface 60 may be provided with dialysis machine 20a as illustrated in FIG. 1 and/or be a remote user interface operating with control unit 50. Control unit 50 may also include a transceiver (not illustrated) and a wired or wireless connection to a network, e.g., the internet, for sending treatment data to and receiving prescription instructions from a doctor's or clinician's server interfacing with a doctor's and/or clinician's computer. The network may be in the form of "a cloud" that allows dialysis machine 20a (and each additional dialysis machine descried herein) and the doctor's and/or clinician's computer to interact.

Volumetric balancing chambers 40a and 40b are passive components in that they do not receive electrical input and are not under direct control by control unit 50. Volumetric balancing chambers 40a and 40b are instead operated via fluid pressure as directed by their associated valves. Volumetric balancing chambers 40a and 40b each include a fixed volume chamber 42, which may be made of any medically safe material discussed herein. Fixed volume chambers 42 include a flexible diaphragm or membrane 44, which flexes back and forth to (i) receive a volume of used dialysis fluid and dispel a like volume of fresh dialysis fluid and (ii) receive a volume of fresh dialysis fluid and dispel a like volume of used dialysis fluid. In this way, fresh and used dialysis fluid delivered to and from dialyzer 12 is matched. Flexible diaphragms or membranes 44 may be made of a durable and medically safe rubber, e.g., silicone, which does nor permanently deform over multiple uses. A separate operation is then performed as discussed below to remove a desired amount of ultrafiltration ("UF") from the patient, who is connected to arterial and venous lines 14 and 16 extending from dialyzer 12.

Volumetric balancing chambers 40a and 40b may alternatively be provided with pressure sensors outputting to control unit 50, which provide supervision so that pressures within the chambers and connecting lines do not elevate to a point causing a dialysis fluid leakage. The balancing chamber pressure sensors or perhaps position sensors may be provided to count the number of strokes made by diaphragms or membranes 44. Volumetric balancing chambers 40a and 40b convey energy from one side of membrane 44 to the other, such that a single dialysis fluid pump 24 may be employed. Dialysis fluid pump 24 in an embodiment is used to keep track of the flow and volume so that membranes 44 do not have to reach the outer rigid walls of the chambers.

It is contemplated to use the outputs from pressure sensors 34f and 34u to detect if a membrane 44 has reached an end-of-stroke. Pressure sensor 34f is located on the positive pressure side of chambers 40a and 40b and may therefore be used to set membrane 44 at a known position within the rigid chamber, so that there is no risk for high positive pressures.

For volumetric balancing chambers 40a and 40b, valves 28h and 28m are fresh dialysis fluid inlet valves, respectively. Valves 28g and 28j are fresh dialysis fluid outlet valves, respectively. Valves 28i and 28l are used dialysis fluid inlet valves, respectively. Valves 28f and 28k are used dialysis fluid outlet valves, respectively.

In FIGS. 1 to 4, valves that are darkened are open, while valves that are unshaded are closed. FIG. 1 illustrates a startup phase in which control unit 50 verifies that a fresh dialysis fluid composition is correct via conductivity readings assuming an online dialysis fluid generation source is used instead of bagged dialysis fluid. Control unit 50 also sets the ratios of, e.g., piston, pump 24 and the pumps associated with the online dialysis fluid generation source. In FIG. 1, control unit 50 causes fresh dialysis fluid inlet valve 28a, upstream diverter valve 28b and downstream diverter valve 28e to be open such that dialysis fluid pump 24 can pump fresh dialysis fluid to drain via drain line 48d. Volumetric balancing chambers 40a and 40b are not involved.

Figure 14:
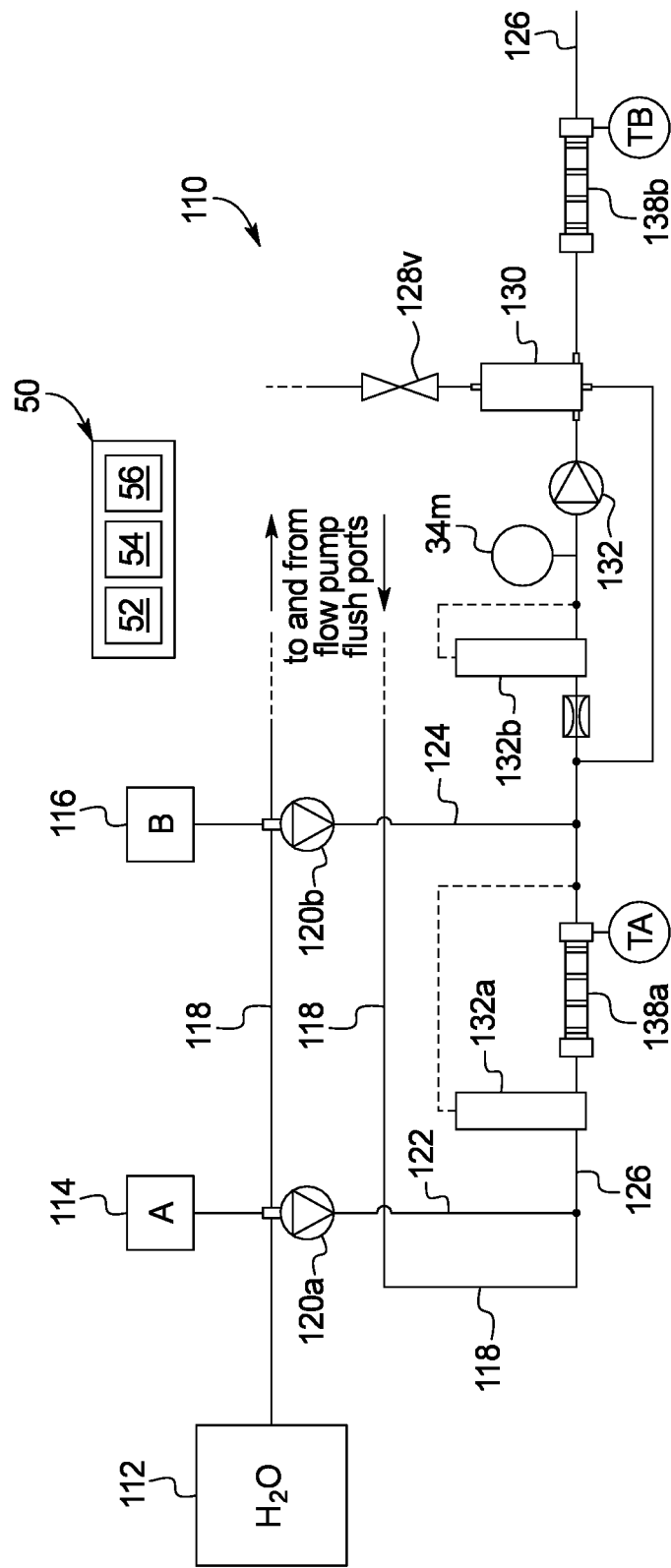
FIG. 14 is a schematic view of one embodiment of an online dialysis fluid mixing circuit (blood or PD), which may be used with any of the machines and systems described herein.

The startup phase of FIG. 1 may be performed initially during a priming sequence in which necessary reusable and disposable fluid lines and necessary flow components are primed to remove air from dialysis machine 20a. Here, flexible dialysis fluid lines 62a, 62b connected to dialyzer 12 during treatment are connected instead to recirculation connectors 64a, 64b respectively to form a fluid side treatment loop. In an embodiment, dialyzer 12 and volumetric balancing chambers 40a and 40b are not primed during this phase. Dialyzer 12 may be primed later by closing vent valve 28v and filling airtrap 30. The startup phase of FIG. 1 may be performed again one or more time during treatment with flexible dialysis fluid lines 62a, 62b connected to dialyzer 12 as shown in FIG. 1 to reset the ratios of dialysis fluid pump 24 and the pumps of the dialysis fluid mixing circuit (FIG. 14).

Figure 2:
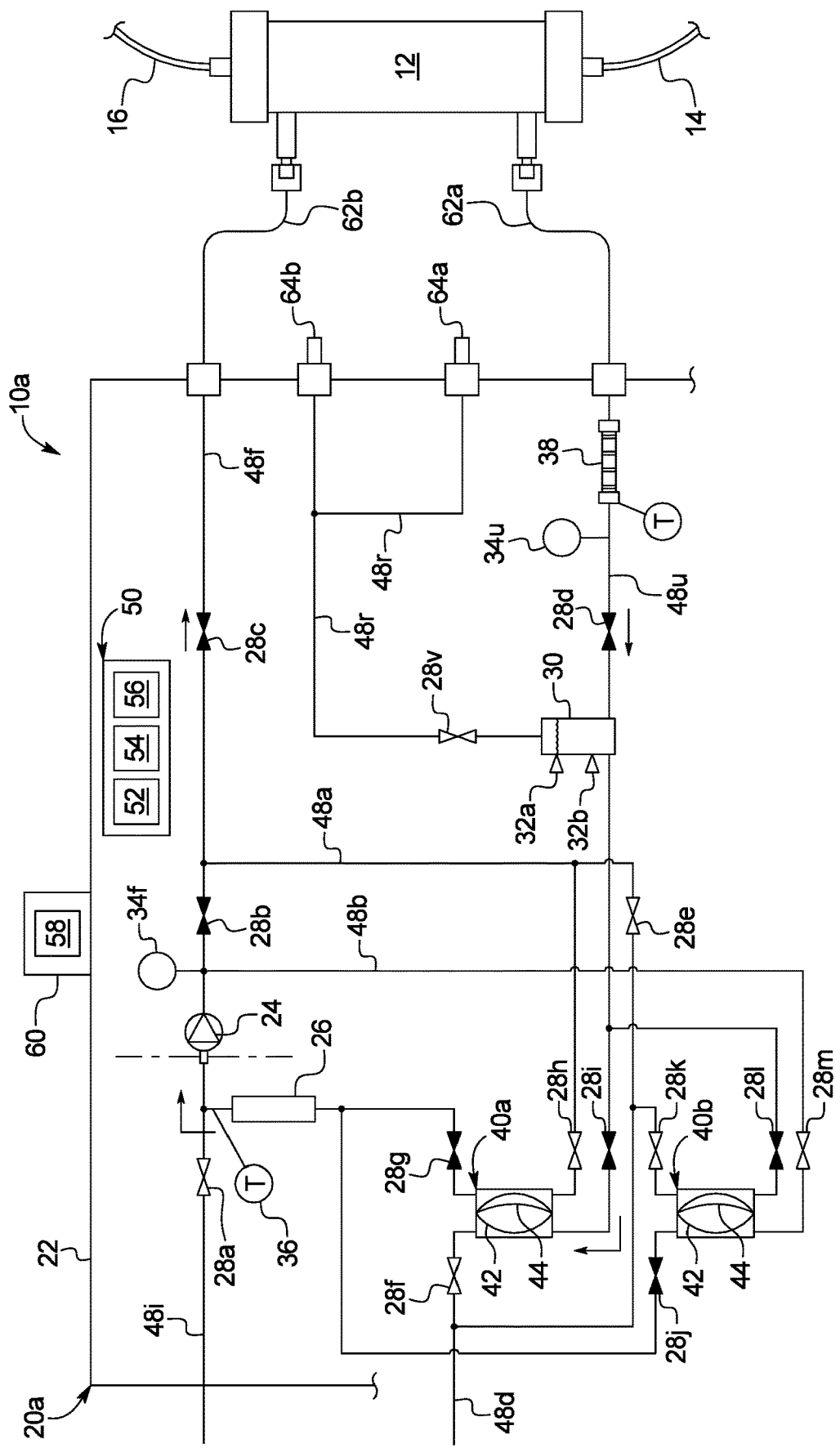
FIG. 2 is a schematic view of the blood treatment dialysis machine and associated system of FIG. 1 in a dialysis fluid flow phase.

FIG. 2 illustrates a dialysis fluid flow phase in which control unit 50 causes used dialysis fluid to be removed from dialyzer 12 through a reusable used dialysis fluid line 48u and a like amount of fresh dialysis fluid to be delivered to dialyzer 12 via a fresh dialysis fluid line 48f. Here, control unit 50 causes upstream diverter valve 28b, fresh dialysis fluid outlet valve 28c, used dialysis fluid inlet valve 28d, first and second chamber used dialysis fluid inlet valves 28i and 28l, and first and second chamber fresh dialysis fluid outlet valves 28g and 28j to be opened. Control unit 50 causes dialysis fluid pump 24 to pull fresh dialysis fluid from volumetric balancing chambers 40a and 40b, through inline heater 26 where the fresh dialysis fluid is heated to body temperature or 37° C., after which the heated, fresh dialysis is delivered via fresh dialysis fluid line 48f and flexible dialysis fluid line 62b to dialyzer 12. That pumping action pulls diaphragms 44 across rigid chambers 42 of volumetric balancing chambers 40a and 40b, creating a negative pressure that pulls a like volume of used dialysis fluid from dialyzer 12, through flexible dialysis fluid line 62a and used dialysis fluid line 48u, into both rigid chambers 42.

It should be appreciated that while both volumetric balancing chambers 40a and 40b are illustrated as being used in the dialysis fluid flow phase of FIG. 2, only a single volumetric balancing chamber 40a or 40b may be used in an alternative embodiment. In one example, one of the chambers, e.g., upper chamber 40a is dedicated to being the main treatment chamber, while the other or lower chamber 40b is used as a "UF pull" chamber discussed in detail below. Here, system 10a always knows the volume present, and on which side of membranes 44 it resides, in the chamber. A total of n number of cycles may be run filling and emptying the upper chamber, and then on the n+1 cycle, the UF chamber is used (which may also be only a part of a full chamber stroke).

Figure 3:
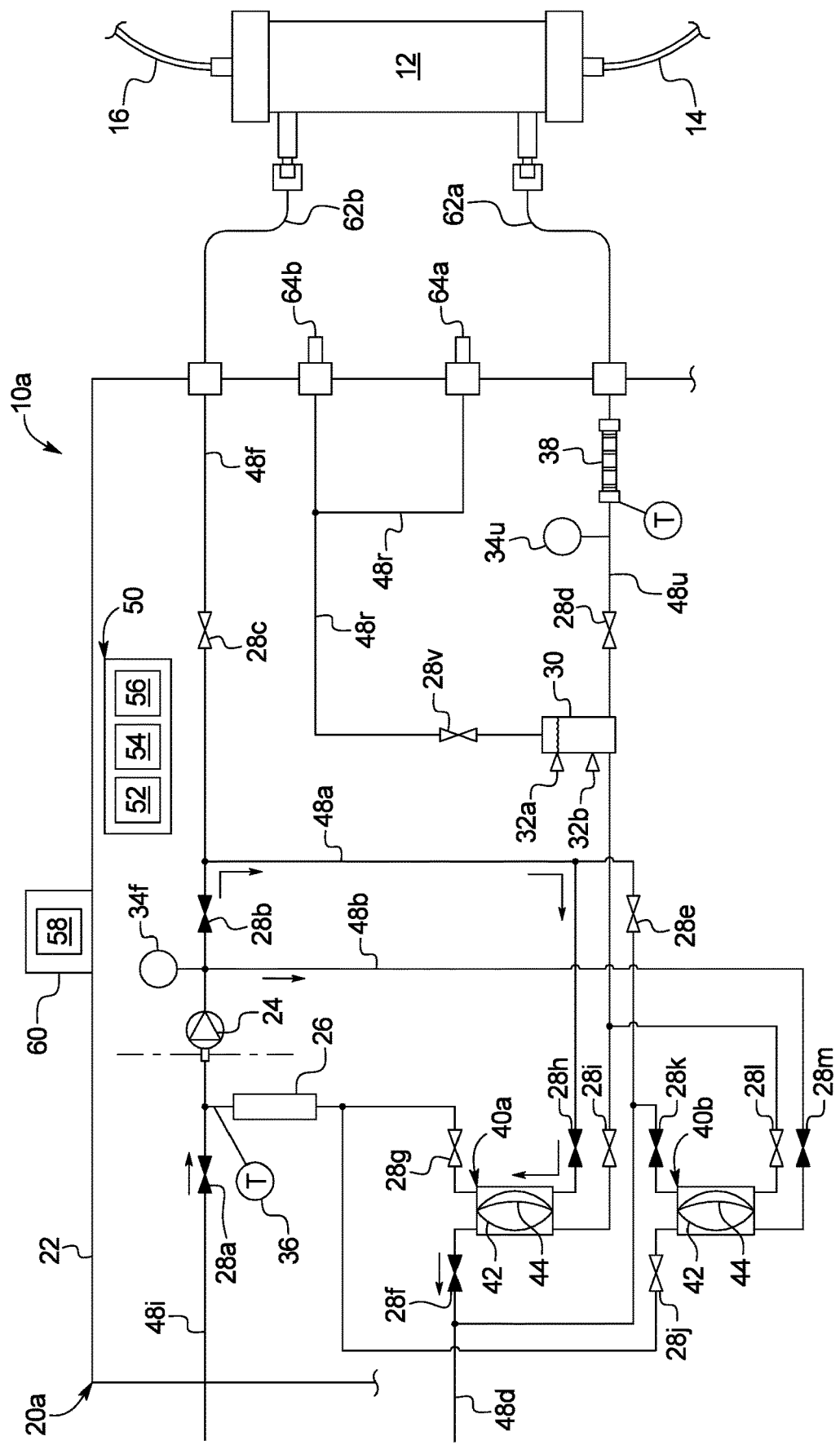
FIG. 3 is a schematic view of the blood treatment dialysis machine and associated system of FIG. 1 in a replenish phase.

FIG. 3 illustrates a dialysis fluid replenish phase in which control unit 50 causes used dialysis fluid to be delivered from volumetric balancing chambers 40a and 40b to drain (container or house drain) via drain line 48d, which is caused by a like amount of fresh dialysis fluid being delivered to volumetric balancing chambers 40a and 40b via dialysis fluid inlet line 48i and recirculation lines 48a and 48b, respectively. Here, control unit 50 causes fresh dialysis fluid inlet valve 28a, upstream fresh dialysis fluid diverter valve 28b, fresh dialysis fluid inlet valves 28h, 28m and used dialysis fluid outlet valves 28f and 28k to be opened. Control unit 50 causes dialysis fluid pump 24 to push fresh dialysis fluid into volumetric balancing chambers 40a and 40b, bypassing inline heater 26 in the illustrated embodiment. That pumping action pushes diaphragms 44 across rigid chambers 42 of volumetric balancing chambers 40a and 40b, creating a positive pressure that pushes a like volume of used dialysis fluid from chambers 40a and 40b, through drain line 48d to a drain container or house drain.

It should be appreciated that while both volumetric balancing chambers 40a and 40b are illustrated as being used in the dialysis fluid replenish phase, only a single volumetric balancing chamber 40a or 40b may be used in an alternative embodiment. It should also be appreciated that at the completion of the dialysis fluid replenish phase of FIG. 3, dialysis fluid from chambers 40a and 40b are full of fresh dialysis fluid and are thus ready to perform the dialysis fluid flow phase of FIG. 2. The phases of FIGS. 2 and 3 may therefore be repeatedly sequenced one after another for as many times as desired. Because the replenish phase does not involve dialyzer 12, any pressure requirements associated with the dialyzer are not applicable. Control unit 50 may therefore operate dialysis fluid pump 24 at a faster pumping rate, constrained by the pump's capabilities and perhaps safe operating pressure limits associated with chambers 40a and 40b. Fresh and used dialysis fluid flow to and from dialyzer 12 may therefore be more continuous with only small time breaks to reload chambers 40a and 40b.

Even if dialysis fluid flow to and from dialyzer 12 is reduced due to intermittent flow due to replenishing, the lower dialysis fluid flowrate is not an issue where system 10a is employed to provide HHD at home or CRRT at a hospital since treatment times may be longer in both cases than for chronic treatments in clinics. HHD treatments may be performed while the patient sleeps, which provides potentially twice as much time for treatment compared to a typical four hour chronic treatment. CRRT is performed continuously while the patient receives care at the hospital, so treatment time and dialysis fluid flowrate are not an issue. A typical chronic HD treatment has a treatment time of about four hours and a dialysis fluid flowrate Qd of 500 milliliters/minute (ml/min) and a blood flowrate Qb of 300 ml/min. With these flowrates, and using a Revaclear 300 dialyzer, for example, the reduction in urea is calculated to C, Urea (t=4 h)/C, Urea (t=0)=0.272, leaving 27.2% after four hours of treatment. For β2M (a middle molecule) the corresponding result is that 31% is left after the four hour treatment.

If, in one scenario, it is assumed that system 10a only achieves a dialysis fluid flowrate Qd of 100 ml/min, and assuming blood flowrate Qb remains 300 ml/min, if treatment time is allowed to expand to eight hours, urea removal ends up almost at the same point, 27.3% left, while β2M reduction actually improves to 13.5% left. System 10a may therefore deliver an equally efficient treatment even if dialysis fluid flowrate Qd is greatly reduced assuming blood flowrate Qb remains at 300 ml/min and treatment time is expanded. It should also be noted for system 10a that even if the dialysis fluid is not flowing within dialyzer 12 during the replenish phase of FIG. 3 and UF phase of FIG. 4 (below), diffusion still occurs.

Figure 4:
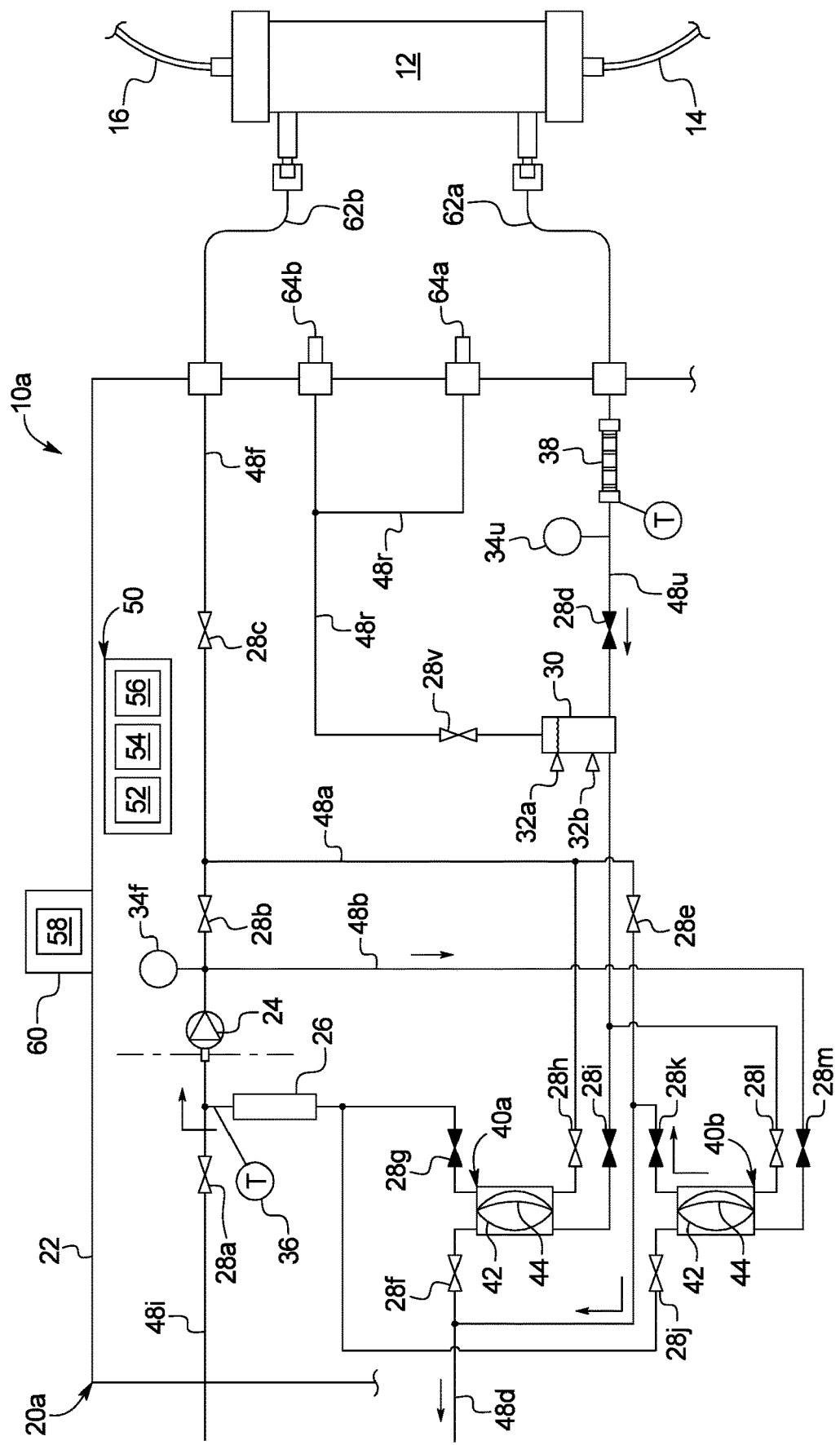
FIG. 4 is a schematic view of the blood treatment dialysis machine and associated system of FIG. 1 in an ultrafiltration ("UF") phase.

FIG. 4 illustrates an ultrafiltration or UF phase in which control unit 50 causes fresh dialysis fluid to be delivered from one volumetric balancing chamber 40a or 40b to the other via recirculation line 48a or 48b, which in turn pushes used dialysis fluid from the fresh dialysis fluid receiving balancing chamber 40a or 40b to drain (container or house drain) via drain line 48d. In the illustrated embodiment, control unit 50 causes fresh dialysis fluid outlet valve 28g, used dialysis fluid inlet valve 28d, used dialysis fluid inlet valve 28i, used dialysis fluid outlet valve 28k and fresh dialysis fluid inlet valve 28m to be opened. Control unit 50 causes dialysis fluid pump 24 to pull fresh dialysis fluid from volumetric balancing chamber 40a and to push same to volumetric balancing chamber 40b during which inline heater 26 may or may not be powered. That pumping action pulls diaphragm 44 across rigid chamber 42 of volumetric balancing chamber 40a, creating a negative pressure that pulls a like volume of used dialysis fluid from dialyzer 12, through used dialysis fluid line 48u, and into volumetric balancing chamber 40a. That pumping action also pushes diaphragm 44 across rigid chamber 42 of volumetric balancing chamber 40b, creating a positive pressure that pushes a like volume of used dialysis fluid from volumetric balancing chamber 40b to drain via drain line 48d.

The UF phase removes fluid from the patient (via dialyzer 12) because a volumetric balancing chamber volume's worth of used dialysis fluid is delivered to drain without a corresponding volume of fresh dialysis fluid being delivered to dialyzer 12. At the end of the UF phase in FIG. 4, volumetric balancing chamber 40a is full of used dialysis fluid, which may then be pushed to drain via fresh dialysis fluid from volumetric balancing chamber 40b, resulting in another volumetric balancing chamber volume's worth of UF fluid being delivered to drain without a corresponding volume of fresh dialysis fluid being delivered to dialyzer 12. Control unit 50 may sequence back and forth, removing UF volumes to drain until a desired local UF volume is reached. When the desired local UF volume is reached, volumetric balancing chambers 40a and 40b are set to the same state or condition, e.g., both either full of fresh or used dialysis fluid, so that delivery to and from dialyzer 12 and replenishing may continue.

System 10a is advantageous because UF may be performed whenever it is desired and may be optimized for patient and/or treatment purposes. UF removal may be performed primarily or totally at the beginning of treatment, primarily or totally at the end of treatment, primarily or totally at in the middle of treatment, or according to any desired UF profile, including evenly throughout treatment. For example, after N number of dialysis fluid flow phase strokes of FIG. 2, control unit 50 causes two UF strokes of FIG. 4 to occur, after which control unit 50 replenishes whichever volumetric balancing chamber 40a or 40b has used dialysis fluid with fresh dialysis fluid. The UF profiles may be patient specific and be stored in one or more memory 54. Any patient may have one or more stored UF profile.

The longer treatment times mentioned above are also beneficial for UF because UF removal rates can be lowered. It has been shown that a UF removal rate of less than 10 ml/hour/kg results in a lower risk for cardiovascular and other types of comorbidities. (Kidney International 2011). For a 70 kg patient performing an eight hour treatment, a UF removal rate less than 10 ml/hour/kg is achieved if the UF volume to be removed is less than 5600 ml (note that 4480 ml is achieved at a pace of 8 ml/hour/kg). A significant amount of UF may accordingly be removed over an eight hour treatment while remaining below 10 ml/hour/kg.

In the following example for system 10*a*, assume:
Qb=300 ml/min
Quf=60 ml/min (taking it as 20% of Qb, which is common)
Qd=160 ml/min (flow to and from dialyzer 12)
Qrep=450 ml/min (replenish fluid flow)

In the above example, to deliver 48 liters of dialysis fluid (Qd (avg)=100 [ml/min], which is less than Qd=160 ml/min due to replenishing and UF removal) and pull 4480 ml of UF, system 10*a* spends 62.3% of the time in pumping dialysis fluid to and from dialyzer 12 (FIG. 2), 22.2% of the time in the replenish phase (FIG. 3), and 15.5% of the time in the UF phase (FIG. 4). Comparing this to a 50/50 split in an eight hour single needle treatment, which is known to have an efficiency comparable to standard chronic treatments, system 10 is expected to perform well. Note again that the UF volume used in the example is considered to be very high, such that an eight hour treatment time may not be needed and may be lessened.

It should be appreciated that for controlling volume, the known volume of volumetric balancing chambers 40*a*, 40*b* may be used for volume control volume in addition to the inherent accuracy of dialysis fluid pump 24, e.g., piston pump. That is, there are two redundant ways to control volume in system 10*a*. Control unit 50 may compare volumes determined from counting strokes of balancing chambers 40*a*, 40*b* with what control unit 50 thinks piston pump 24 has pumped. The compared volumes may for example be UF removed volumes, determined both ways to ensure UF removal accuracy.

After treatment, control unit 50 causes blood treatment dialysis machine 20*a* of system 10*a* to perform a disinfection sequence. Here, flexible dialysis fluid lines 62*a*, 62*b* are disconnected from dialyzer 12 and are connected instead to recirculation connectors 64*a*, 64*b* respectively, to form a disinfection loop. If blood treatment dialysis machine 20*a* is an in-center chronic machine, disinfection may proceed as is standard in such situations, wherein a supply of purified water is provided, which may be heated and/or combined with a chemical disinfectant for disinfection. Likewise, if an online dialysis fluid generation source or mixing circuit (FIG. 14) is provided, e.g., for HHD, purified water may again be heated and/or combined with a chemical disinfectant for disinfection. For CRRT, in the case where bagged treatment fluid is used, a bagged chemical disinfectant may be provided (which may also be heated) and connected to dialysis fluid inlet line 48*i*. An online dialysis fluid generation source may alternatively or additionally be used with CRRT, in which case purified water for the online source may be used for heated disinfection. In any of the above scenarios, drain line 48*d* may be (i) left in place extending to a drain container or house drain, (ii) removed and capped or (iii) connected at its distal end to a dedicated port (not illustrated) to form part of the disinfection loop, although it may not be desirable to place the drain line in fluid circulation with the other fluid lines of dialysis machine 20*a*. Heated and/or chemical disinfection fluid may be pumped back and forth while any one or more or all of the valves are sequenced so that all inner surfaces of the lines and components are sufficiently contacted by the disinfection fluid to properly disinfect blood treatment dialysis machine 20*a* for the next treatment.

Figure 5:
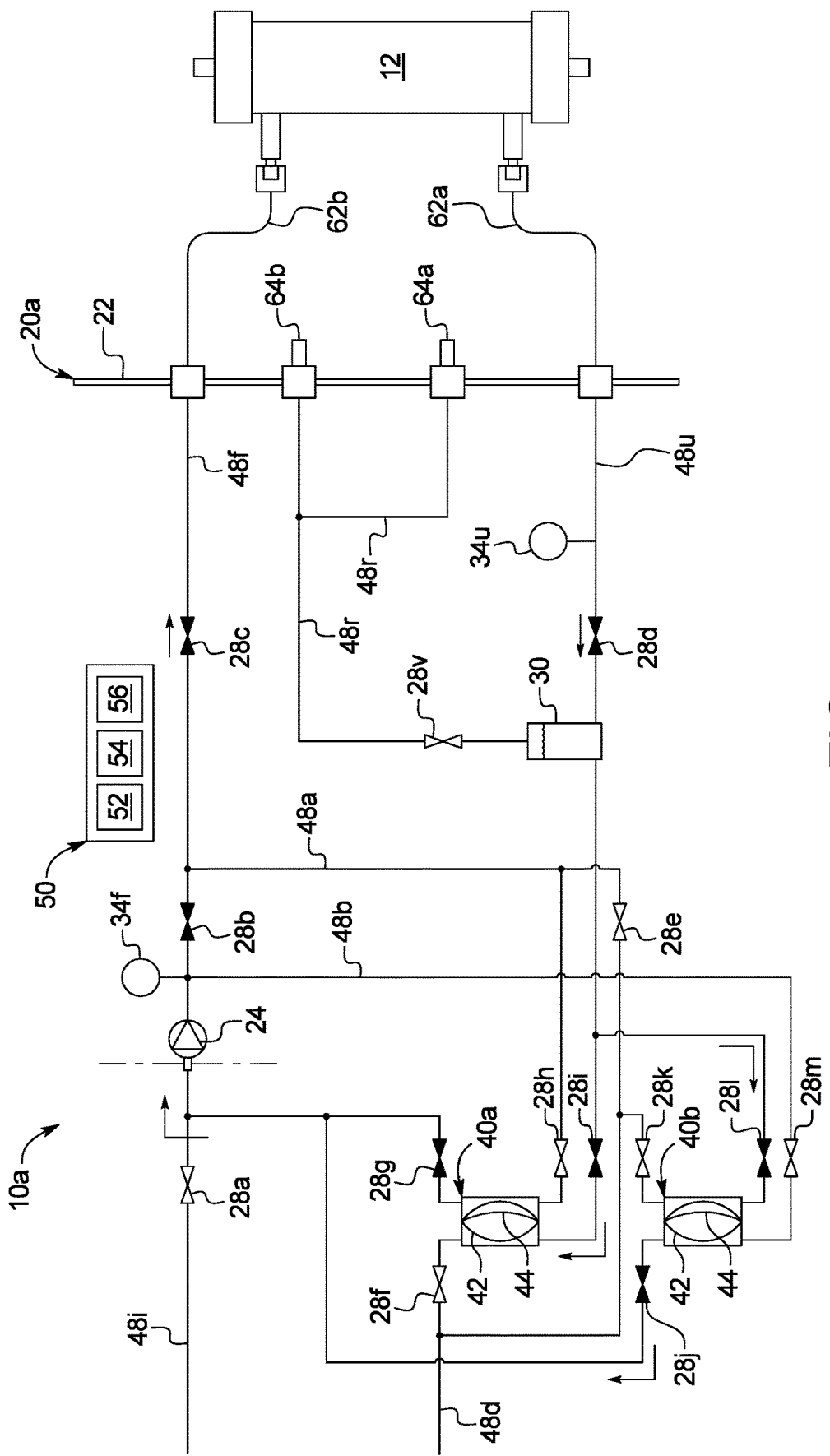
FIGS. 5 to 9 illustrate an alternative valve sequencing and pump operation for the blood treatment dialysis machine and associated system of FIG. 1.

It should be appreciated that the sequencing of the valves by control unit 50 and the resulting fluid flow paths of system 10*a* may vary and may be chosen to achieve certain desirable features. FIGS. 5 to 9 illustrate one possible alternative sequencing of the valves by control unit 50 for the operation of system 10*a*. In FIG. 5, control unit 50 opens valves 28*b*, 28*c*, 28*d*, 28*g*, 28*i*, 28*j* and 28*l*, while the other valves remain closed. Control unit 50 runs metering pump 24, which pulls fresh dialysis fluid from both volumetric balancing chambers 40*a* and 40*b* simultaneously and pushes same through fresh dialysis fluid line 48*f* and flexible dialysis fluid line 62*b* to dialyzer 12. Such pumping action via the movement of membranes 44 across rigid chambers 42 also causes used dialysis fluid to be pulled from dialyzer 12, through flexible dialysis fluid line 62*a* and used dialysis fluid line 48*u*, filling volumetric balancing chambers 40*a*, 40*b* simultaneously with used dialysis fluid.

An issue may arise if both chambers 40*a* and 40*b* are not fully emptied of fresh dialysis fluid at the same time. It is contemplated for control unit 50 to look to the output from pressure sensor 34*u* to know when both chambers 40*a* and 40*b* are fully emptied as there will be no dynamic pressure change when membranes 44 reach their respective end-of-stroke position within rigid chambers 42.

Figure 6:
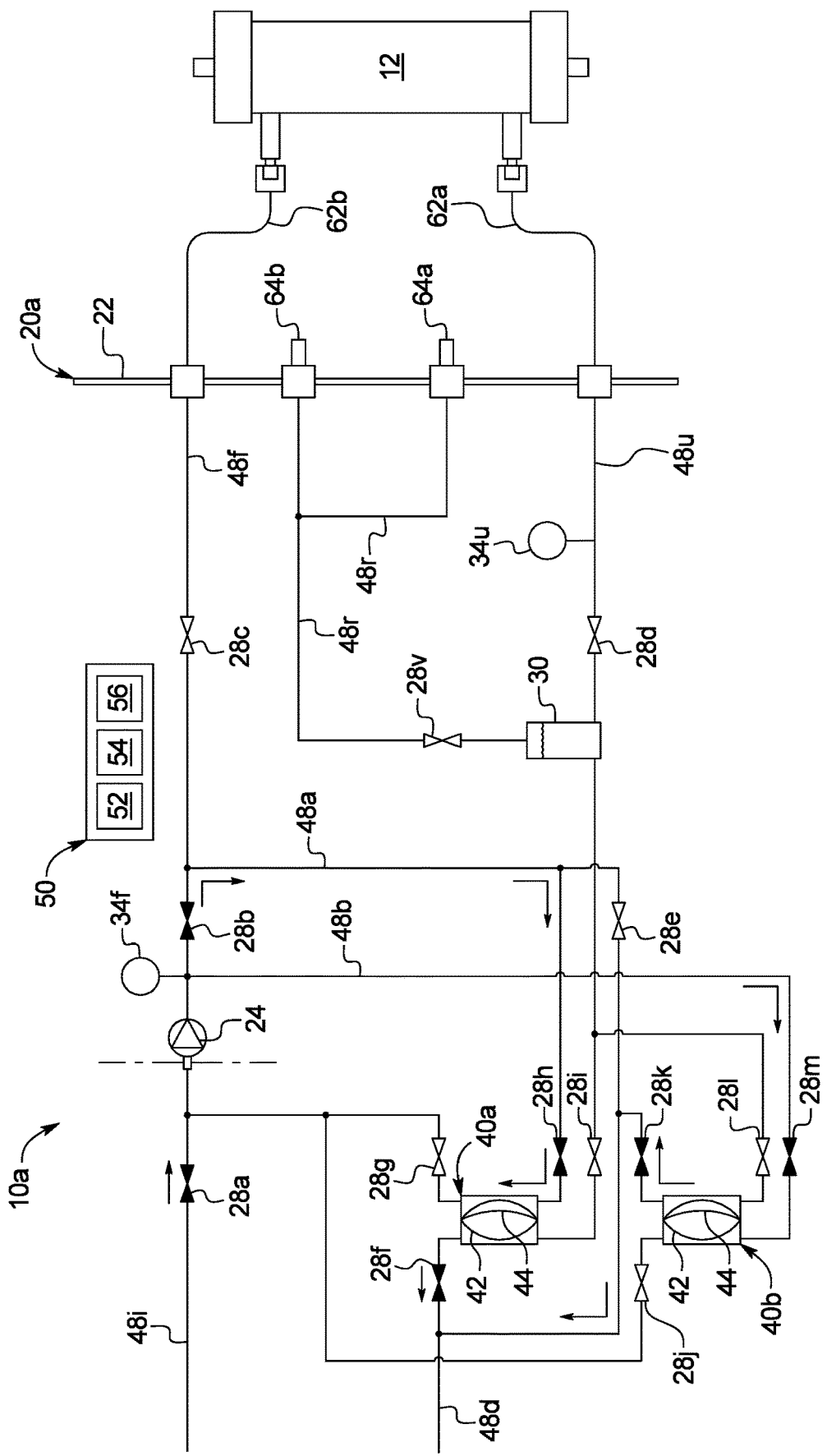

In FIG. 6, control unit 50 opens valves 28*a*, 28*b*, 28*f*, 28*h*, 28*k* and 28*m* while the other valves remain closed. Control unit 50 runs metering pump 24, which pushes fresh dialysis fluid to both volumetric balancing chambers 40*a* and 40*b* simultaneously to accomplish replenishing. Such pumping action also causes used dialysis fluid to be pushed to drain via drain line 48*d* due to the movement of membranes 44 across rigid chambers 42. An issue may again arise if both chambers 40*a* and 40*b* are not fully filled with fresh dialysis fluid at the same time. It is contemplated for control unit 50 to look to the output from pressure sensor 34*f* to know when both chambers 40*a* and 40*b* are completely filled with fresh dialysis fluid as there will be no dynamic pressure change when membranes 44 reach their respective end-of-stroke position within rigid chambers 42.

Figure 7:
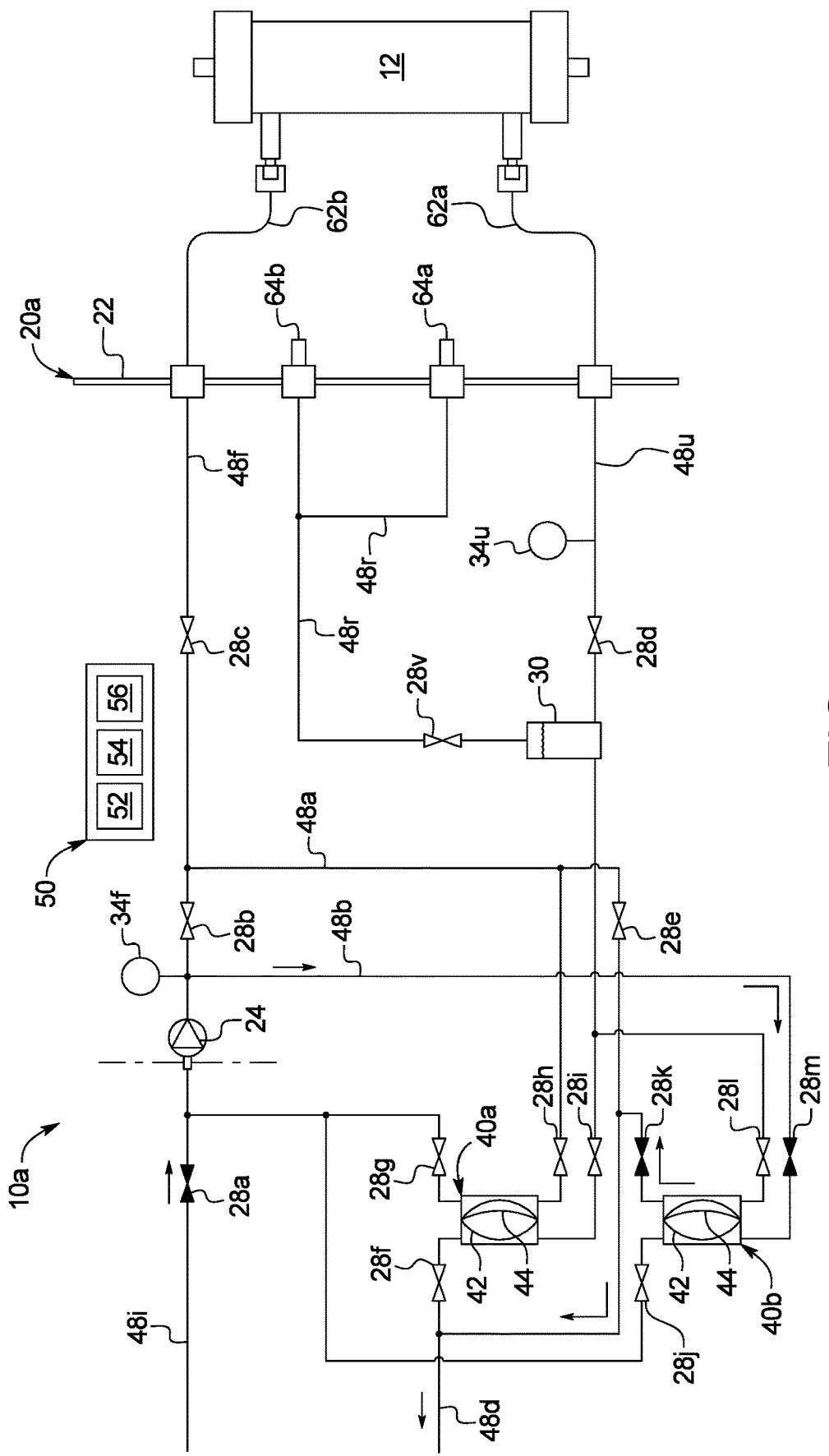

In FIG. 7, control unit 50 opens valves 28*a*, 28*k* and 28*m* while the other valves remain closed. Control unit 50 runs metering pump 24, which pushes fresh dialysis fluid to volumetric balancing chamber 40*b*. Such pumping action also causes used dialysis fluid to be pushed from volumetric balancing chamber 40*b* to drain via drain line 48*d* due to the movement of membrane 44 across rigid chamber 42. Because there is no corresponding delivery of fresh dialysis fluid to dialyzer 12, FIG. 7 serves as an ultrafiltration preparation sequence.

Figure 8:
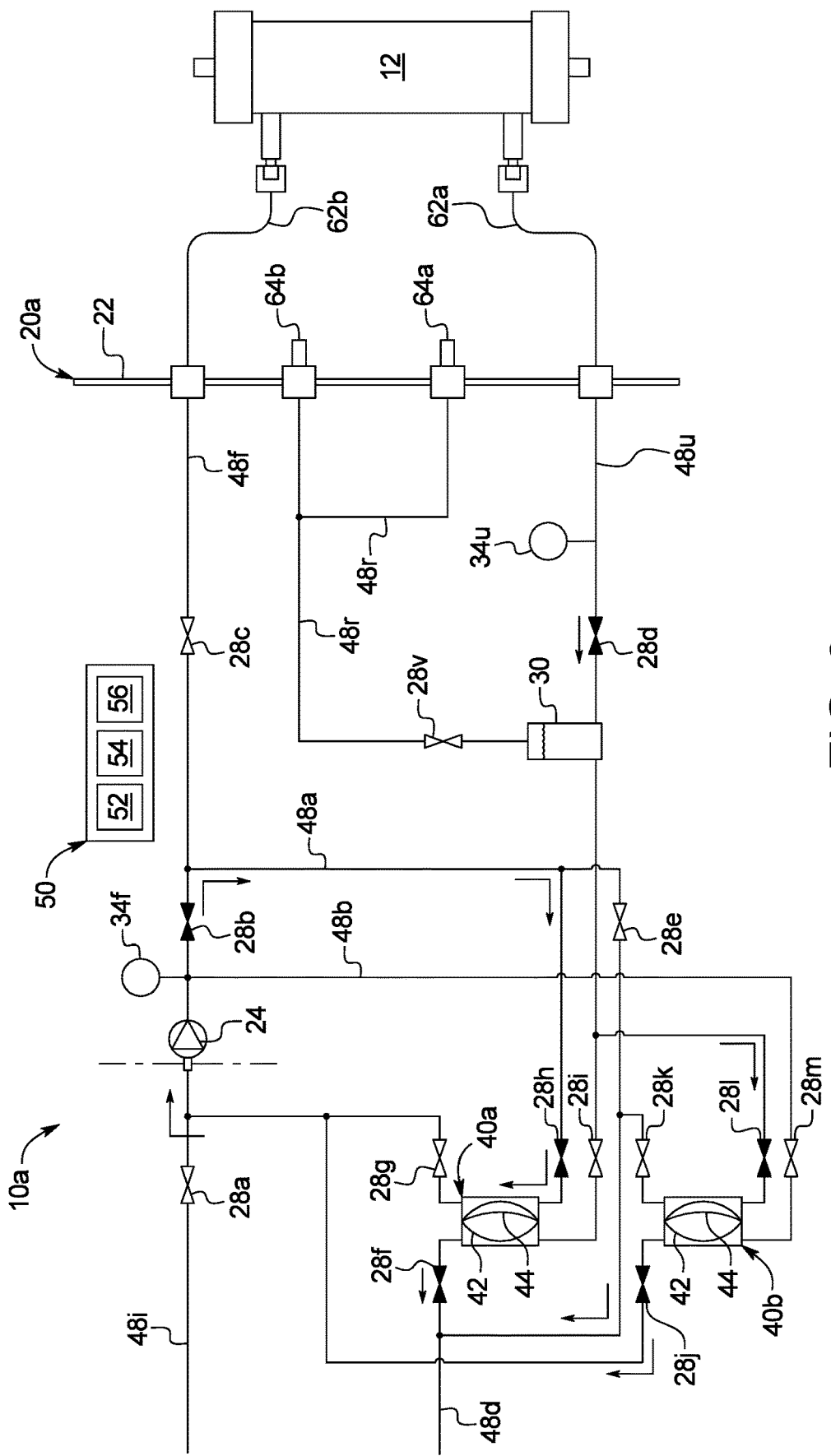

In FIG. 8, control unit 50 opens valves 28*b*, 28*d*, 28*f*, 28*h*, 28*j* and 28*l* while the other valves remain closed. Control unit 50 runs metering pump 24, which pulls fresh dialysis fluid from volumetric balancing chambers 40*b* and pushes same to volumetric balancing chambers 40*a*. Such pumping action also causes used dialysis fluid to be pushed from volumetric balancing chamber 40*a* to drain via drain line 48*d* due to the movement of membrane 44 across rigid chamber 42. Also, used dialysis fluid is pulled into volumetric balancing chambers 40*b* from dialyzer 12 due to the movement of membrane 44 across rigid chamber 42. Because there is no corresponding delivery of fresh dialysis fluid to dialyzer 12, FIG. 8 serves as a second ultrafiltration sequence in which a chamber volume's worth of ultrafiltration is removed from the patient.

Figure 9:
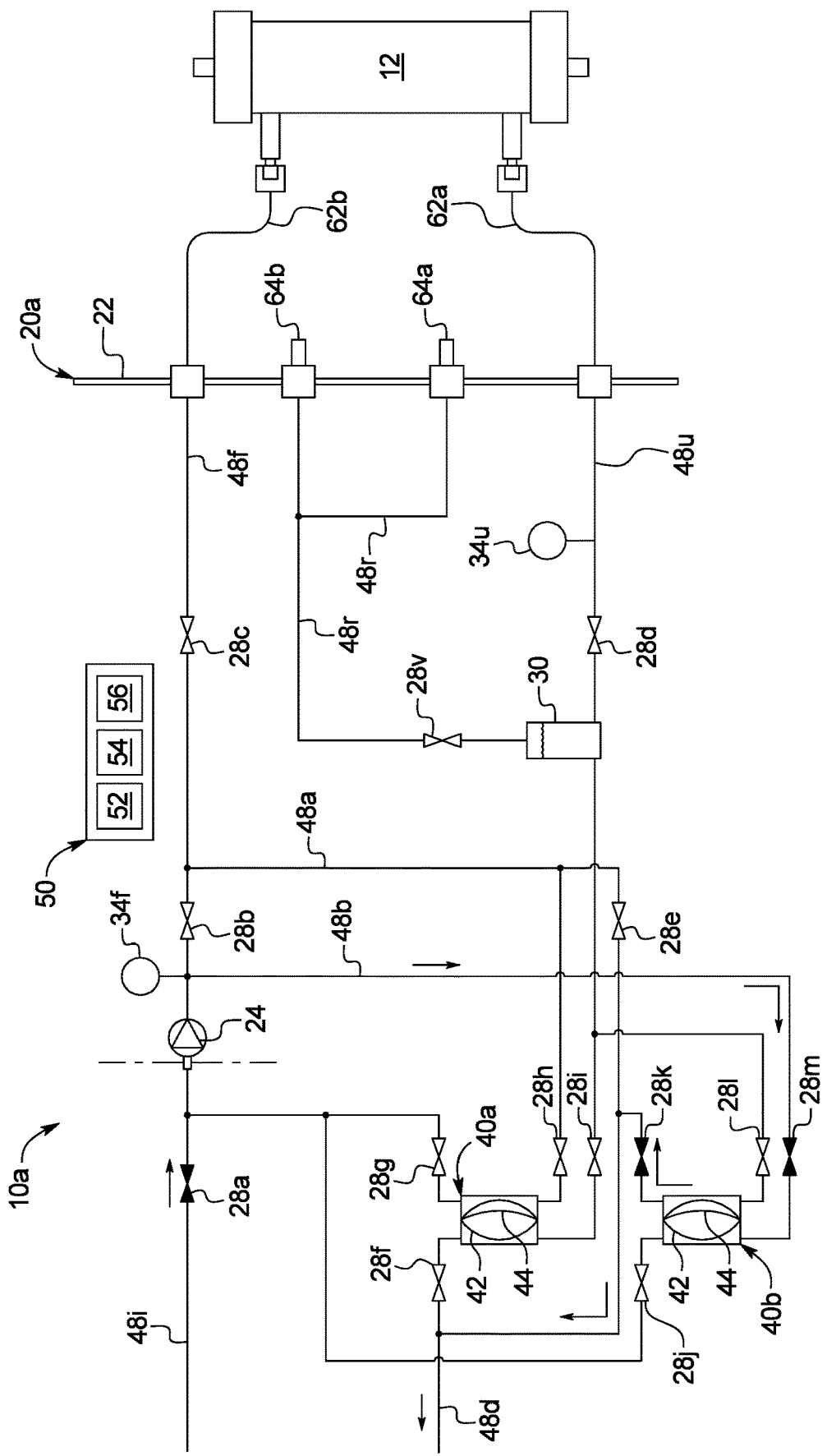

At the end of multiple first and second ultrafiltration sequences resulting in a desired amount of ultrafiltration being removed from the patient, volumetric balancing chamber 40a is full of fresh dialysis fluid, while volumetric balancing chamber 40b is full of used dialysis fluid. Both volumetric balancing chambers 40a and 40b need to be full of fresh dialysis fluid to resume the treatment of FIGS. 5 to 9 in which fresh dialysis fluid is delivered to dialyzer 12 from both chambers 40a and 40b simultaneously. In FIG. 9, control unit 50 opens valves 28a, 28k and 28m while the other valves remain closed. Control unit 50 runs metering pump 24, which pushes fresh dialysis fluid to volumetric balancing chamber 40b. Such pumping action also causes used dialysis fluid to be pushed from volumetric balancing chamber 40b to drain via drain line 48d due to the movement of membrane 44 across rigid chamber 42. FIG. 9 serves as an ultrafiltration finishing and dialysis resuming sequence in which volumetric balancing chamber 40b is filled with fresh dialysis fluid so that both chambers 40a and 40b are ready to deliver fresh dialysis fluid to dialyzer 12.

The operation of FIGS. 5 to 9 as discussed above may require membranes 44 to move to an end-of-stroke position to ensure that volumetric balancing chambers 40a and 40b are in sync prior to the next operation. In the operation of system 10a according to FIGS. 1 to 4, membranes 44 do not have to move to an end-of-stroke position because only one volumetric balancing chamber 40a or 40b is delivering fresh dialysis fluid to dialyzer 12 at a given time. The accuracy of metering pump 24 in FIGS. 1 to 4 is relied upon to achieve accurate ultrafiltration removal from the patient.

Peritoneal Dialysis Treatment Systems

Figure 10:
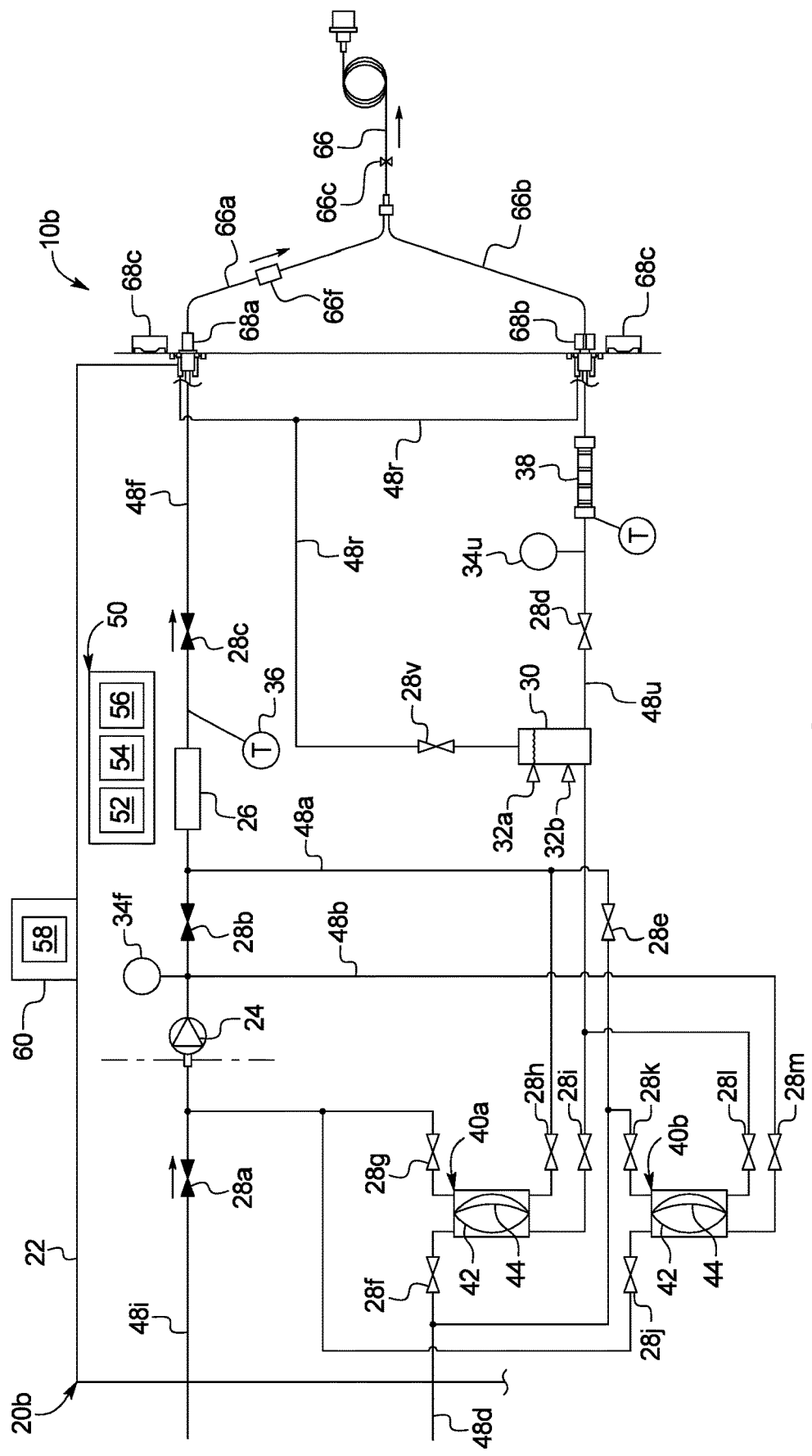
FIG. 10 is a schematic view of one embodiment of a peritoneal dialysis ("PD") machine and associated system of the present disclosure in a fill phase.

Referring now to FIG. 10, a peritoneal dialysis ("PD") system 10b and associated methodology of the present disclosure includes a PD machine or cycler 20b. System 10b and PD machine 20b likewise attempt to eliminate disposable items as much as possible by providing a majority of its fluid carrying portions as reusable components, which are disinfected after treatment. PD machine 20b includes a housing 22 that holds the reusable flow components and tubes or lines described herein, which are made of any of the materials discussed herein.

PD machine or cycler 20b includes many of the same lines and components discussed above for blood treatment dialysis machine 20a, which are numbered the same and include all structure, functionality and alternatives discussed above for blood treatment dialysis machine 20a. One difference is that heater 26 and temperature sensor 36 are moved to fresh dialysis fluid line 48f (which location may also be used for blood treatment dialysis machine 20a). Heater 26 and temperature sensor 36 may alternatively be left in the location of system 10a. Further alternatively, if an online PD fluid generation source is provided, it may heat the PD fluid instead. Still further alternatively, if containers or bags of PD fluid are provided, the PD fluid within the containers or bags, or within a dedicated heating container, may be heated via a batch heater. Another difference is that dialyzer 12 and flexible dialysis fluid lines 62a, 62b are removed and a PD fluid patient line 66 is provided instead. Recirculation connectors 64a, 64b are replaced with different structure for recirculation and disinfection as discussed below. PD fluid patient line 66 includes a fresh leg 66a and a used leg 66b, which are connected respectively to fresh and used PD fluid machine connectors 68a and 68b, respectively. In the illustrated embodiment, a sterilizing grade filter 66f is located in or along fresh leg 66a of patient line 66 and provides a final stage of PD fluid filtration prior to delivery to the patient. Sterilizing grade filter 66f may for example be a pass-through filter that does not have a reject line. Pore sizes for sterilizing grade filter 66f may, for example, 0.1 to 0.2 micron. Suitable sterilizing grade filters for filter 66f may, for example, be a Pall IV-5 or GVS Speedflow filter, or be a filter provided by the assignee of the present disclosure. Fresh and used PD fluid machine connectors 68a and 68b are covered by spring-actuated port lids 68c when fresh leg 66a and used leg 66b are not connected to fresh and used PD fluid machine connectors 68a and 68b, e.g., for recirculation and disinfection.

PD machine or cycler 20b incudes first and second volumetric balancing chambers 40a and 40b. In FIG. 10, however, first and second volumetric balancing chambers 40a and 40b are not used to fill the patient with fresh, heated PD fluid. Instead, control unit 50 causes valves 28a, 28b and 28c to be opened and causes accurate metering pump 24, e.g., a piston pump, to accurately meter a fill volume's worth of PD fluid (e.g., one to three liters) in along inlet line 48i and out fresh leg 66a and PD fluid patient line 66 to the patient. Control unit 50 receives positive pressure signals from pressure sensor 34f and uses same to control metering pump 24 so that the patient filling pressure is within a positive patient pressure limit, e.g., one to five psig (e.g., two psig (14 kPa). After the patient is filled with a prescribed fill volume, control unit 50 allows the patient fill volume to dwell within the patient for a specified period of time.

Control unit 50 may also be programmed to know the pressure drop through sterilizing grade filter 66f, which is dependent on the flowrate of fresh PD fluid flow through the filter, and which may be taken into account in determining positive patient pumping pressure. The pressure drop across sterilizing grade filter 66f will increase as treatment advances and filter 66f becomes blocked. A clamp 66c, which may be a manual clamp or be an automated clamp under control of control unit 50 and located on the outside of or within a door of housing 22, may be closed before each patient fill. Control unit 50 then pumps a small amount of fresh PD past fluid sterilizing grade filter 66f and pressure sensors 34f and 34u to detect the amount of increased pressure drop across sterilizing grade filter 66f. Control unit 50 takes the new pressure drop into account in determining positive patient pumping pressure for the subsequent patient fill. Alternatively or additionally, the output of pressure sensor 34u located along reusable used dialysis fluid line 48u may be used by control unit 50 as feedback for positive patient pumping pressure. Pressure sensor 34u measures the positive fill pressure during a fill stroke. Because PD fluid in used dialysis fluid line 48u is still during a patient fill, pressure sensor 34u is able to measure the pressure at the split point of PD fluid patient line 66 into fresh leg 66a and used leg 66b. Such pressure is a reflection of the flow and flow resistance to the patient. If PD fluid flow upstream of the split point varies, pressure sensor 34 will detect that variation. The pressure measured by pressure sensor 34u is also a function of flow restrictions in PD fluid patient line 66, the patient's transfer set and the patient's indwelling catheter.

Figure 11:
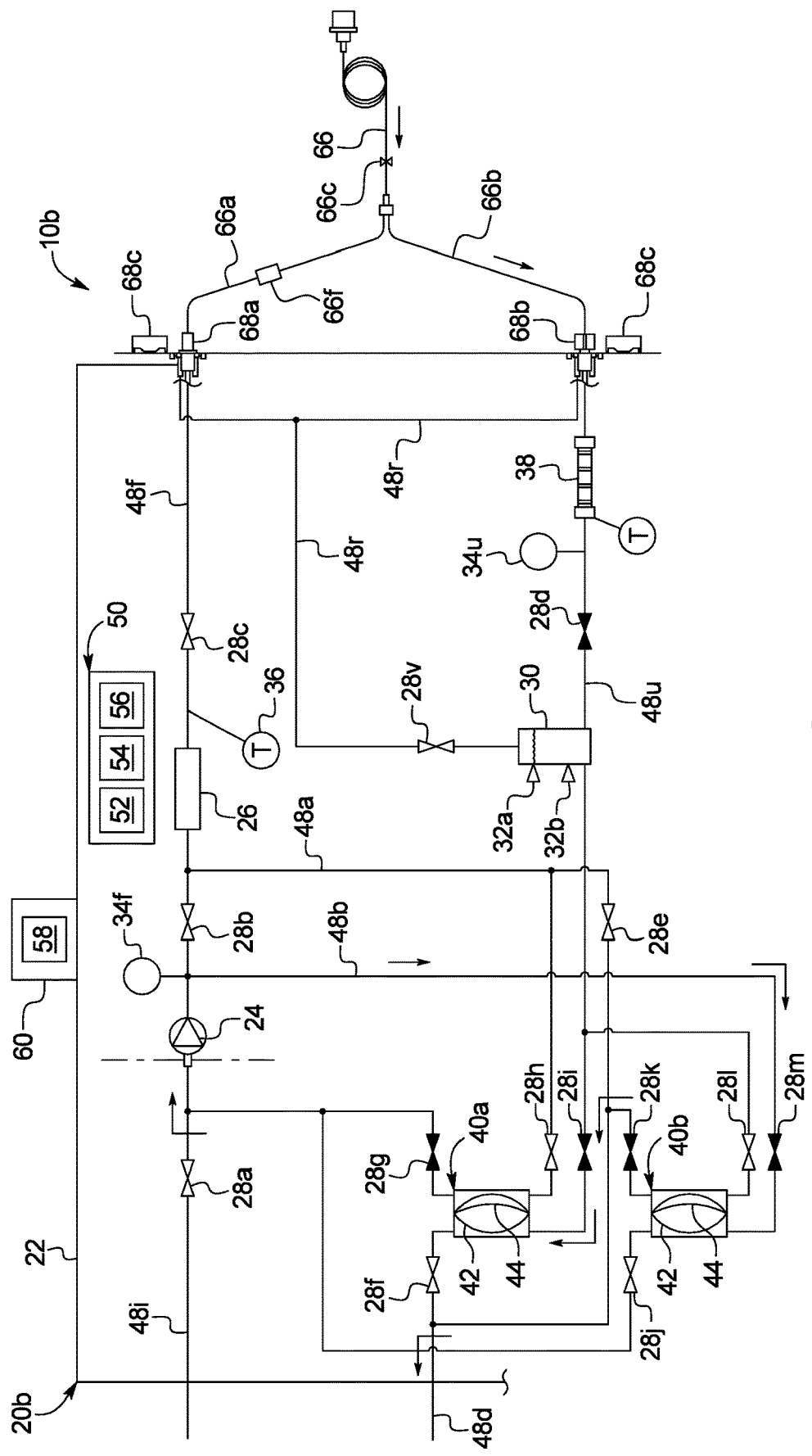
FIG. 11 is a schematic view of one embodiment of the PD machine and associated system of FIG. 10 the present disclosure in a drain phase.

FIG. 11 illustrates one embodiment of a patient drain using PD machine or cycler 20b of system 10b. In the illustrated embodiment, control unit 50 causes chamber outlet valves 28g and 28k, used PD fluid inlet valve 28d, and chamber inlet valves 28i and 28m to be opened. Control unit 50 causes dialysis fluid pump 24 to pull fresh PD fluid from volumetric balancing chamber 40a via chamber outlet valve 28g and to push same to volumetric balancing chamber 40b via chamber inlet valve 28m. That pumping action pulls diaphragm 44 across rigid chamber 42 of volumetric balancing chamber 40a, creating a negative pressure that pulls a like volume of used PD fluid from the patient via used leg 66b, through used PD fluid inlet valve 28d and chamber inlet valves 28i into volumetric balancing chamber 40a. That pumping action also pushes diaphragm 44 across rigid chamber 42 of volumetric balancing chamber 40b, creating a positive pressure that pushes a like volume of used PD fluid from volumetric balancing chamber 40b via chamber outlet valve 28k to drain via drain line 48d.

In a next patient drain stroke, control unit 50 closes chamber outlet valves 28g and 28k and chamber inlet valves 28i and 28m. Control unit 50 opens chamber outlet valves 28f and 28j, chamber inlet valves 28h and 28l, and upstream fresh dialysis fluid diverter valve 28b. Dialysis fluid pump 24 in this stroke pulls fresh PD fluid from volumetric balancing chamber 40b and delivers same to balancing chamber 40a. That pumping action also pushes used PD fluid from volumetric balancing chamber 40a to drain via drain line 44d and pulls used PD fluid from the patient into balancing chamber 40b. Control unit 50 sequences the valve states as described above back and forth while operating dialysis fluid pump 24 until a desired amount of PD fluid is removed from the patient. Output signals from pressure sensor 34u are monitored by control unit 50, which uses same to control dialysis fluid pump 24 to ensure that PD fluid removal from the patient is performed within a negative patient pressure limit, e.g., −1.0 psig to −3.0 psig (e.g., −1.3 psig (−9 kPa)).

The excess water removed from the patient over a full cycle (patient fill, patient dwell and patient drain) may be estimated by control unit 50, which calculates the excess water removed as the total amount of used PD fluid removed from the patient via FIG. 11 less the total amount of fresh fluid delivered to the patient via FIG. 10.

After treatment, control unit 50 causes PD machine or cycler 20b of system 10b to perform a disinfection sequence. Here, PD fluid patient line 66 is removed and discarded. Port lids 68c spring closed and seal over PD fluid machine connectors 68a and 68b. The closing of port lids 68c brings a recirculation line 48r into fluid communication with the disinfected lines of PD machine or cycler 20b, forming a disinfection loop. Recirculation line 48r also extends to the top of airtrap 30. If an online PD fluid generation source is provided, purified water may be heated and/or combined with a chemical disinfectant for disinfection. If bagged PD fluid is used, residual bagged PD fluid may be heated and used for disinfection. Heated and/or chemical disinfection fluid may be pumped back and forth while any one or more or all of the valves are sequenced so that all inner surfaces of the lines and components are sufficiently contacted by the disinfection fluid to properly disinfect PD machine 20b for the next treatment. In any of the above scenarios, drain line 48d as with the disinfection of blood treatment dialysis machine 20a may be (i) left in place extending to a drain container or house drain, (ii) removed and capped or (iii) connected at its distal end to a dedicated port (not illustrated) to form part of the disinfection loop, although it may not be desirable to place the drain line in fluid circulation with the other fluid lines of PD machine 20b.

Figure 12:
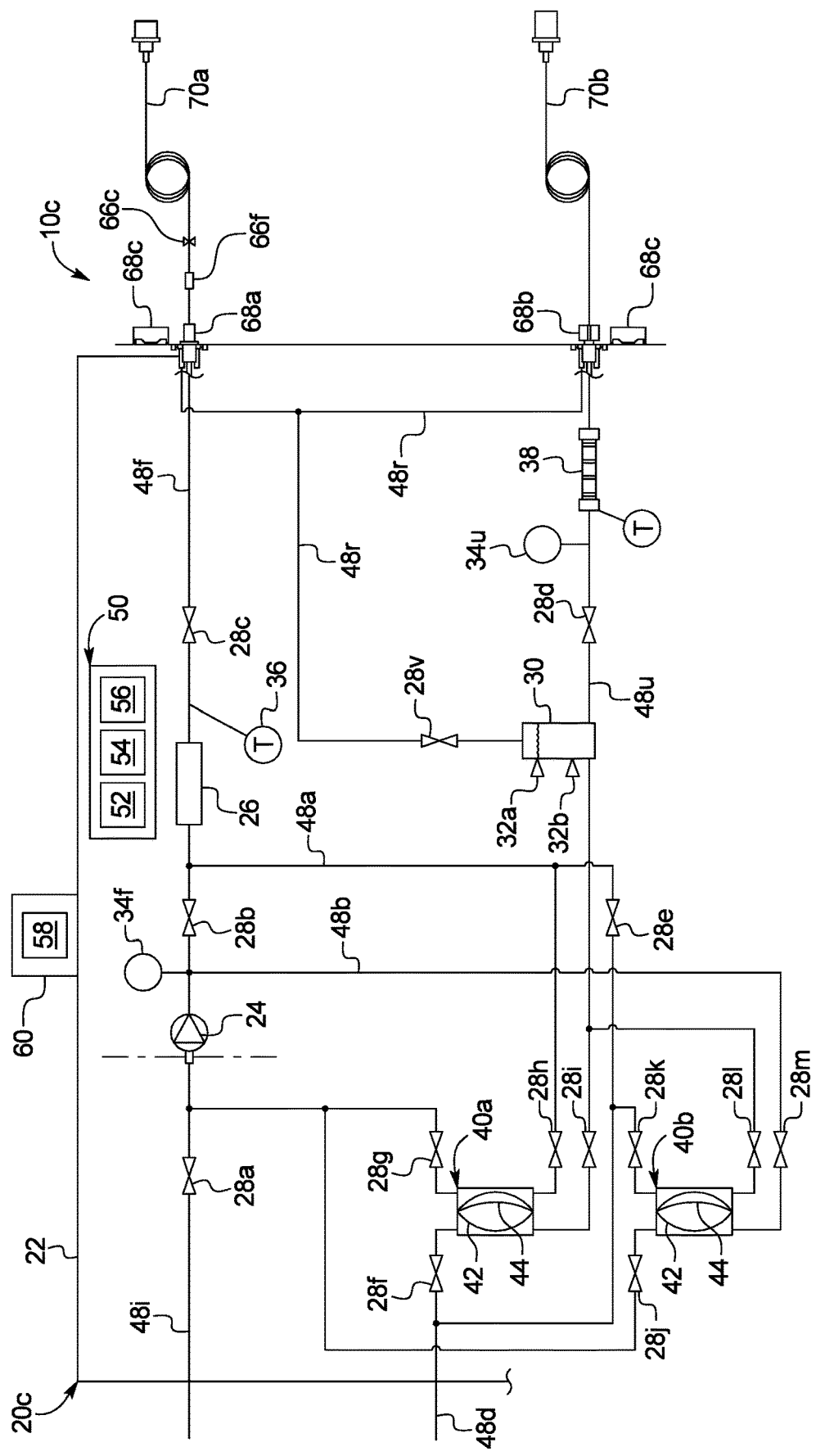
FIG. 12 is a schematic view of one embodiment of a continuous flow peritoneal dialysis ("CFPD") machine and associated system of the present disclosure.

Referring now to FIG. 12, a continuous flow peritoneal dialysis ("CFPD") system 10c and associated methodology of the present disclosure includes a PD machine or cycler 20c. System 10c and CFPD machine 20c likewise attempt to eliminate disposable items as much as possible by providing a majority of its fluid carrying portions as reusable components, which are disinfected after treatment. CFPD machine 20c includes a housing 22 that holds the reusable flow components and tubes or lines described herein, which are made of any of the materials discussed herein.

CFPD machine or cycler 20c includes many of the same lines and components discussed above for PD machine 20b, which are numbered the same and include all structure, functionality and alternatives discussed above for blood treatment dialysis machine 20a. As with PD machine 20b, heater 26 and temperature sensor 36 are moved to fresh dialysis fluid line 48f again for CFPD machine or cycler 20c. Alternatively, if an online PD fluid generation source is provided, it may heat the PD fluid instead. Further alternatively, if containers or bags of PD fluid are provided, the containers or bags of PD fluid may be heated via a batch heater.

CFPD machine or cycler 20c of system 10c in FIG. 12 includes a fresh PD fluid patient line 70a that is separated from a used PD fluid patient line 70b, which are connected respectively to fresh and used PD fluid machine connectors 68a and 68b. Fresh PD fluid patient line 70a extends to a separate catheter or lumen of a dual lumen catheter than is used PD fluid patient line 70b.

With CFPD machine or cycler 20c of system 10c, fresh, heated PD fluid may be delivered to the patient in the same manner as described in connection with FIG. 10 for PD system 10b. Again, first and second volumetric balancing chambers 40a and 40b are not used to fill the patient with fresh, heated PD fluid. Instead, control unit 50 causes valves 28a, 28b and 28c to be opened and causes accurate metering pump 24, e.g., a piston pump, to accurately meter a desired amount of fresh PD fluid in along inlet line 48i and out fresh PD fluid patient line 70a to the patient. Also, with CFPD machine or cycler 20c of system 10c, used PD fluid may be removed from the patient in the same manner as described in connection with FIG. 11 for PD system 10b. Control unit 50 may calculate the excess water removed from the patient over a full cycle (patient fill, patient dwell and patient drain) in the same manner discussed above by subtracting the total amount of fresh PD fluid delivered from a total amount of used PD fluid removed from the patient.

The primary difference with CFPD machine or cycler 20c of system 10c is that control unit 50 does not cause a patient dwell to occur between the patient fill and the patient drain. Control unit 50 may instead cause the patient fill and the patient dwell to occur virtually simultaneously, e.g., N number of fill strokes of metering pump 24 followed by N or N plus UF number of drain strokes of metering pump 24. Here, the patient receives fresh PD fluid while draining used PD fluid. It should be appreciated that PD cycler 20b of system 10b may also perform such a CFPD treatment since metering pump 24 pumps only fresh or used PD fluid at a given time. It is accordingly expressly contemplated to provide PD cycler 20b of system 10b with the ability and software to perform either modality. There may be patient benefits to switching between continuous cycling peritoneal dialysis ("CCPD", fill, dell and drain) and CFPD. Or, a clinician may experiment with both modalities on a single patient to see which modality produces better results. As illustrated, the disposable components vary between CCPD and CFPD. The patient may be shipped both types of disposables.

In an alternative embodiment, CFPD may be performed in a similar manner as discussed above for FIGS. 2 and 3. Analogous to FIG. 2, fresh PD fluid is here delivered to the patient from volumetric balancing chambers 40a and 40b by backfilling the chambers with used PD fluid from the patient. Analogous to FIG. 3, used PD fluid is delivered to drain from volumetric balancing chambers 40a and 40b by pressurizing the chambers with fresh PD fluid the online or bagged PD fluid source. The sequence of FIG. 2 may then be repeated, and so on. Here, volumetric balancing chambers 40a and 40b ensure the amount of fresh PD fluid delivered to the patient equals the amount of used PD fluid removed from the patient. At some point, as with FIG. 4, only fresh PD fluid is used to actuate volumetric balancing chambers 40a and 40b to perform a desired amount of UF strokes.

After treatment, control unit 50 causes PD machine or cycler 20c of system 10c to perform a disinfection sequence. Here, fresh PD fluid patient line 70a and used PD fluid patient line 70b are removed and discarded. Port lids 68c again spring closed and seal over PD fluid machine connectors 68a and 68b. The closing of port lids 68c brings recirculation line 48r into fluid communication with the disinfected lines of PD machine or cycler 20c, forming a disinfection loop. If an online PD fluid generation source is provided, purified water may be heated and/or combined with a chemical disinfectant for disinfection. If bagged PD fluid is used, residual bagged PD fluid may be heated and used for disinfection. Heated and/or chemical disinfection fluid may be pumped back and forth while any one or more or all of the valves are sequenced so that all inner surfaces of the lines and components are sufficiently contacted by the disinfection fluid to properly disinfect PD machine 20c for the next treatment. In any of the above scenarios, drain line 48d as with the disinfection of machines 20a and 20b may be (i) left in place extending to a drain container or house drain, (ii) removed and capped or (iii) connected at its distal end to a dedicated port (not illustrated) to form part of the disinfection loop, although it may not be desirable to place the drain line in fluid circulation with the other fluid lines of PD machine 20b.

Figure 13:
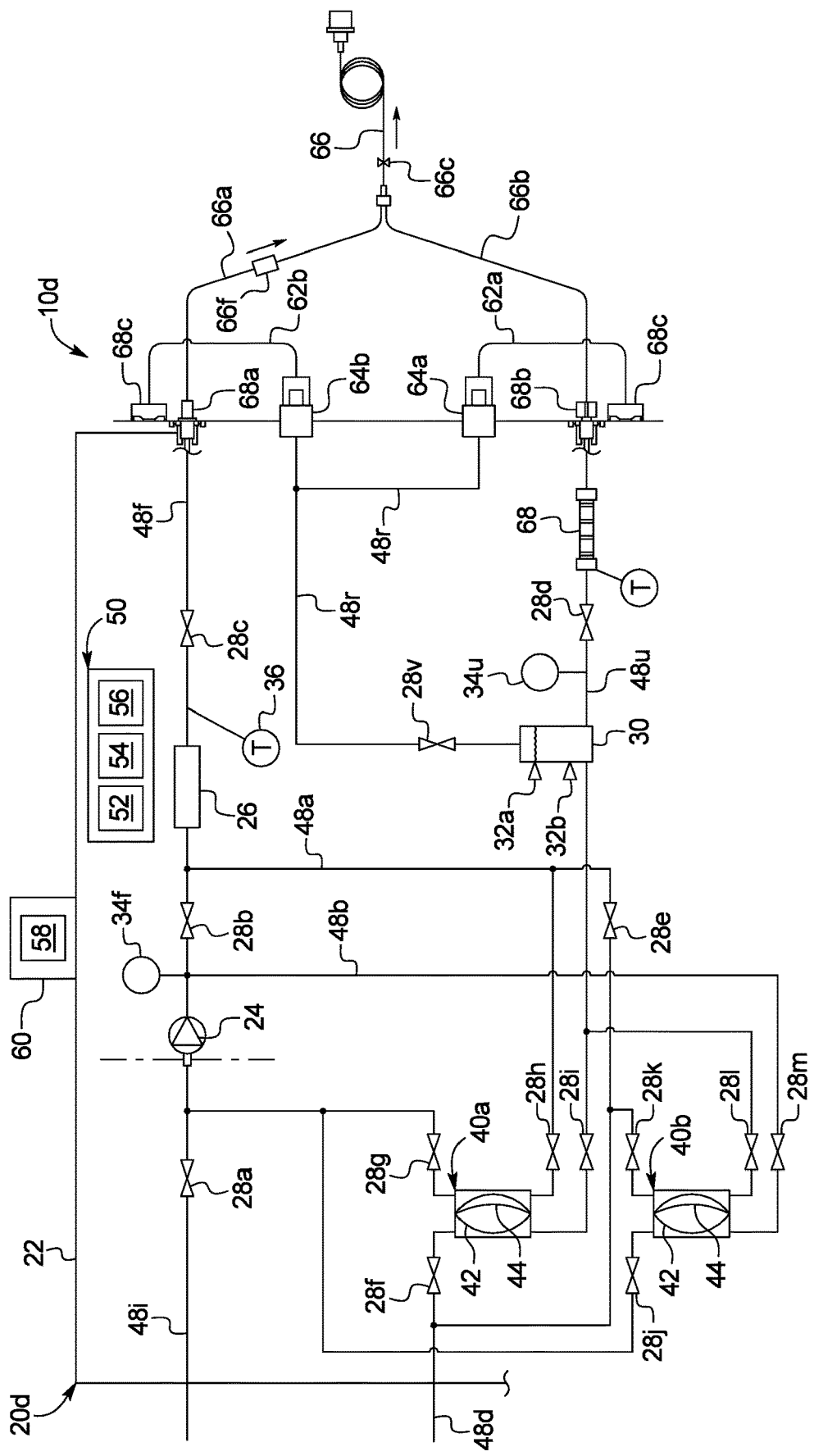
FIG. 13 is a schematic view of one embodiment of a combination or hybrid PD machine and associated system of the present disclosure.

Referring now to FIG. 13, HD/PD system 10d including a cycler 20d capable of performing HD, CRRT, CCPD and CFPD is illustrated. HD/PD system 10d as illustrated in FIG. 13 is currently configured to run a fill, dwell, drain CCPD type of PD treatment with fresh leg 66a and used leg 66b of PD fluid patient line 66 connected respectively to PD fluid machine connectors 68a and 68b. The CCPD treatment and subsequent disinfection is performed according to FIGS. 10 and 11 discussed above. If a CFPD treatment is desired instead, fresh leg 66a and used leg 66b of PD fluid patient line 66 are removed from PD fluid machine connectors 68a and 68b, respectively. Fresh PD fluid patient line 70a and used PD fluid patient line 70b of system 10c of FIG. 12 are connected instead to machine connectors 68a and 68b, respectively. The CFPD treatment and subsequent disinfection is performed according to FIG. 12 discussed above. If an HD or CRRT treatment is desired instead, fresh leg 66a and used leg 66b of PD fluid patient line 66 are removed from PD fluid machine connectors 68a and 68b, respectively. Port lids 68c spring closed and seal over PD fluid machine connectors 68a and 68b. Flexible dialysis fluid lines 62a, 62b are connected each at one end to port lids 68c and communicate fluidly with the insides of port lids. The closing of port lids 68c thus brings flexible dialysis fluid lines 62a and 62b into fluid communication with fresh dialysis fluid line 48f and used dialysis fluid line 48u, respectively. The distal ends of fresh dialysis fluid line 48f and used dialysis fluid line 48u are then disconnected from recirculation connectors 64a, 64b (where they are reconnected for disinfection) and connected instead to the dialysis fluid ports of dialyzer 12 for treatment. The HD or the CRRT treatment is carried out according to FIGS. 1 to 4 discussed above.

It is accordingly expressly contemplated to provide HD/PD cycler 20d of system 10d with the ability and software to perform a blood treatment and a PD treatment, and indeed multiple forms of each (HD vs. CRRT and CCPD vs. CFPD). There may be patient benefits to switching between HD and PD as detailed in U.S. Pat. No. 9,227,003, assigned to the assignee of the present disclosure and incorporated herein. A clinician may again experiment with both CCPD and CFPD modalities on a single patient to see which modality produces better results. As illustrated, the disposable components vary between HD, CCPD and CFPD. The patient may be shipped all needed types of disposables. Moreover, even if HD/PD cycler 20d performs only one modality for a single patient, there is still a significant advantage in being able to make a single machine that performs both blood and PD modalities. To this end, metering pump 24 and heater 26 (here likely an inline heater) are sized to handle pumping pressures, fluid flowrates and the heating requirements for any type of HD or PD modality.

Referring now to FIG. 14, one embodiment for a mixing circuit is illustrated by circuit 110. Mixing circuit 110 may be under control of control unit 50 or may be under control of its own control unit. If under the control of its own control unit, the control unit may communicate bidirectionally with control unit 50, so that control unit 50 may command when circuit 110 does or does not mix dialysis fluid for HD or PD. All pumps and vent valve 128v of mixing circuit 110 are under the control the control unit in one embodiment. The conductivity sensors each output to the control unit. Mixing circuit 110 includes a purified water source 112. Purified water source 112 may include any one or more of carbon filtration, resin beds, electrodeionization, ultrafiltration, reverse osmosis, ultraviolet radiation, and/or heat disinfection. Purified water source 112 may be a WRO 300H water purifier provided by the assignee of the present disclosure.

Mixing circuit 110 includes a first concentrate source 114 and a second concentrate source 116. For HD fluid, first concentrate source 114 may include an acid concentrate, while second concentrate source 116 may include a bicarbonate concentrate. For PD fluid, first concentrate source 114 may include an electrolyte concentrate, while second concentrate source 116 may include a glucose concentrate. The concentrates are dosed via accurate dosing pumps 120a and 120b, respectively, which pump the first and second concentrates through concentrate lines 122 and 124 respectively, so that the concentrates enter a mixing line 126. Accurate dosing pumps 120a and 120b may be piston pumps, like metering pump 24 of machines 20a to 20d, which may require a flush flow of purified water. In FIG. 14, purified water is flowed from source 112 through the flush flow ports of dosing pumps 120a and 120b, through the flush flow port of metering pump 24, back into a water line 118 that extends to mixing line 126 to mix with first and second concentrates flowing through concentrate lines 122 and 124.

First concentrate 114 is mixed with purified water in a first mixing chamber 132a. First conductivity sensor 138a senses the resulting conductivity and provides feedback to the control unit for mixing circuit 110 to ensure that first concentrate 114 is mixed properly. Second concentrate 116 is mixed with purified water and first concentrate 114 in a second mixing chamber 132b. Second conductivity sensor 138b senses the resulting conductivity of the two concentrates and purified water and provides feedback to the control unit for mixing circuit 110 to ensure that second concentrate 116 is mixed properly. First and second conductivity sensors 138a and 138 in the illustrated embodiment are each temperature compensated.

Air is removed from the online HD or PD fluid at airtrap 130, which may vent air to atmosphere via vent valve 128. A degassing pump 132 pumps mixed dialysis fluid to airtrap 130, which may include one or more level sensor that ensures that airtrap 130 is sufficiently full of dialysis fluid, wherein the level is replenished via degassing pump 132 as metering pump 24 (at machines 20a to 20d) pulls HD or PD fluid from airtrap 130 as needed.

Mixing circuit 110 is configured to make different PD fluids as desired for different patient fills. The different dextrose or glucose level dialysis fluids may for example be 1.36% glucose dialysis fluid or 2.27% glucose dialysis fluid. A last bag of a different formulation of PD fluid, such as icodextrin, may also be provided in place of mixing circuit 110.

It should be understood that various changes and modifications to the presently preferred embodiments described herein will be apparent to those skilled in the art. It is therefore intended that such changes and modifications be covered by the appended claims.

The invention is claimed as follows:

1. A dialysis system comprising:
a dialysis fluid metering pump;
a first volumetric balancing chamber including a first fixed volume chamber and a first diaphragm positioned and arranged to extend back and forth within the first fixed volume chamber;
a first outlet line extending between the first volumetric balancing chamber and an inlet to the dialysis fluid metering pump;
a second outlet line extending between the first volumetric balancing chamber and a drain line;
a first inlet line extending between the first volumetric balancing chamber and an outlet from the dialysis fluid metering pump;
a second inlet line extending between the first volumetric balancing chamber and a used dialysis fluid line;
a second volumetric balancing chamber including a second fixed volume chamber and a second diaphragm positioned and arranged to extend back and forth within the second fixed volume chamber;
a first outlet line extending between the second volumetric balancing chamber and an inlet to the dialysis fluid metering pump;
a second outlet line extending between the second volumetric balancing chamber and a drain line;
a first inlet line extending between the second volumetric balancing chamber and an outlet from the dialysis fluid metering pump; and
a second inlet line extending between the second volumetric balancing chamber and a used dialysis fluid line.

2. The dialysis system of claim 1, which is a hemodialysis ("HD") system configured to deliver fresh HD fluid to a dialyzer via the dialysis fluid metering pump pulling fresh HD fluid from at least one of the first or second volumetric balancing chambers via respective first outlet line.

3. The HD system of claim 2, which is configured such that pulling fresh HD fluid from at least one of the first or second volumetric balancing chambers via respective first outlet line causes used dialysis fluid to fill at least one of the first or second volumetric balancing chambers via respective second inlet line extending between the first or second volumetric balancing chamber and the used dialysis fluid line.

4. The HD system of claim 2, which includes an inline dialysis fluid heater located upstream or downstream from the dialysis fluid metering pump.

5. The HD system of claim 2, which is configured to repeat pulling of the fresh HD fluid from at least one of the first or second volumetric balancing chambers until a desired amount of fresh HD fluid is delivered to the dialyzer.

6. The HD system of claim 5, which is configured such that at least one of the first or second volumetric balancing chambers is replenished with fresh HD fluid prior to repeating delivery of the fresh HD fluid to the dialyzer.

7. The dialysis system of claim 1, which is a hemodialysis ("HD") system configured to deliver used HD fluid to the drain line via respective second outlet line and via the dialysis fluid metering pump pushing fresh HD fluid to at least one of the first or second volumetric balancing chambers via respective first inlet line.

8. The HD system of claim 7, which is configured such that used HD fluid is precluded from flowing along the used dialysis fluid line when the used HD fluid is delivered to the drain line.

9. The dialysis system of claim 1, which is a hemodialysis ("HD") system configured to perform an ultrafiltration ("UF") stroke via pushing used HD fluid to the drain line without a corresponding delivery of fresh HD fluid to a dialyzer.

10. The HD system of claim 9, which is configured such that the UF stroke occurs via the dialysis fluid metering pump pulling fresh HD fluid from one of the first or second volumetric balancing chambers and pushing the fresh HD fluid to the other of the first or second volumetric balancing chambers, thereby pushing used HD fluid to the drain line without a corresponding delivery of fresh HD fluid to the dialyzer.

11. The HD system of claim 10, which is configured such that the pulling of fresh HD fluid from one of the first or second volumetric balancing chambers by the dialysis fluid metering pump correspondingly pulls used HD fluid into the first or second volumetric balancing chamber.

12. The HD system of claim 10, which is configured to repeat the UF stroke, or a partial UF stroke, until a desired amount of UF is removed to the drain line.

13. The dialysis system of claim 1, which is a peritoneal dialysis ("PD") system, wherein fresh PD fluid is delivered to a patient line via the dialysis fluid metering pump.

14. The PD system of claim 13, which is configured to rely on the accuracy of the dialysis fluid metering pump to pump a prescribed amount of fresh PD fluid to the patient.

15. The PD system of claim 13, which is configured to perform a patient dwell after delivering a prescribed amount of fresh PD fluid to the patient.

16. The PD system of claim 13, which is configured to perform a patient drain in which used PD fluid is delivered to and removed from at least one of the first or second volumetric balancing chambers.

17. The PD system of claim 13, which is configured to determine an amount of excess fluid removed from the patient by subtracting an amount of fresh PD fluid delivered to the patient line from an amount of used PD fluid removed from the patient.

18. The PD system of claim 13, which is (i) a continuous cycling peritoneal dialysis ("CCPD") system, wherein the patient line includes a fresh leg and a used leg, or (ii) a continuous flow peritoneal dialysis ("CFPD") system, in which the patient line is separated into a fresh PD fluid patient line and a used PD fluid patient line.

* * * * *